(12) United States Patent
Alsante

(10) Patent No.: US 10,838,613 B2
(45) Date of Patent: Nov. 17, 2020

(54) CONSUMER ELECTRONIC ENTERTAINMENT AND DISPLAY SYSTEM

(71) Applicant: TRUFAN LLC, Huntersville, NC (US)

(72) Inventor: Christopher Alsante, Cornelius, NC (US)

(73) Assignee: Trufan LLC, Huntersville, NC (US)

( * ) Notice: Subject to any disclaimer, the term of this patent is extended or adjusted under 35 U.S.C. 154(b) by 0 days.

(21) Appl. No.: 15/911,946

(22) Filed: Mar. 5, 2018

(65) Prior Publication Data
US 2018/0260092 A1    Sep. 13, 2018

Related U.S. Application Data

(63) Continuation-in-part of application No. 15/434,403, filed on Feb. 16, 2017, now abandoned.
(Continued)

(51) Int. Cl.
| | | |
|---|---|---|
| *G06F 3/0484* | (2013.01) | |
| *G06F 3/0486* | (2013.01) | |
| *G06F 3/041* | (2006.01) | |
| *H04N 21/41* | (2011.01) | |
| *G06F 3/0488* | (2013.01) | |
| *H04M 1/725* | (2006.01) | |

(Continued)

(52) U.S. Cl.
CPC .......... *G06F 3/0486* (2013.01); *G06F 3/041* (2013.01); *G06F 3/0488* (2013.01); *G08C 17/02* (2013.01); *H04M 1/7253* (2013.01); *H04N 21/4122* (2013.01); *H04M 1/0202* (2013.01); *H04M 2250/02* (2013.01); *H04M 2250/06* (2013.01)

(58) Field of Classification Search
None
See application file for complete search history.

(56) References Cited

U.S. PATENT DOCUMENTS 7,136,282 B1   11/2006 Rebeske
8,763,047 B2 *  6/2014 Grewal .............. H04N 21/4383
                                                    725/25

(Continued)

FOREIGN PATENT DOCUMENTS

WO    WO 2004077395 A1    9/2004

OTHER PUBLICATIONS

United States Patent Office, Patent Cooperation Treaty International Search Report in related application PCT/US18/56400, dated Dec. 14, 2018, pp. 1-14. [only new art cited herein; U.S. Publications 2014/0159992 and 2008/0231544 cited in IDS filed Nov. 14, 2018).

*Primary Examiner* — Nasser M Goodarzi
*Assistant Examiner* — Terrika Peterson
(74) *Attorney, Agent, or Firm* — Shumaker, Loop & Kendrick, LLP

(57) ABSTRACT

An electronic entertainment and display system that includes a mobile operating system application, control unit and website that work together to provide the ability for a user to view multiple audio and video digital user content across multiple display screens from the user's mobile operating system and/or from additionally connected external devices through the control unit. The control unit is connected to the system displays and external devices and displays chosen content through a drag and drop application. The user can choose to interact with any of the audio and video data displayed on the system displays and/or external devices.

1 Claim, 29 Drawing Sheets

Related U.S. Application Data

(60) Provisional application No. 62/296,346, filed on Feb. 17, 2016.

(51) Int. Cl.
    *G08C 17/02* (2006.01)
    *H04M 1/02* (2006.01)

(56) References Cited

U.S. PATENT DOCUMENTS

| | | | |
|---|---|---|---|
| 9,448,708 | B1 | 9/2016 | Bennett |
| 9,553,927 | B2 | 1/2017 | Sharma |
| 2002/0033844 | A1* | 3/2002 | Levy .............. G06F 3/0484 715/744 |
| 2002/0116539 | A1 | 8/2002 | Bryczkowski |
| 2002/0092025 | A1 | 11/2002 | Klumpp |
| 2003/0117109 | A1* | 6/2003 | Trepka .............. H01M 10/46 320/126 |
| 2004/0017513 | A1* | 1/2004 | Takahashi ........ H04N 5/44513 348/552 |
| 2006/0048062 | A1* | 3/2006 | Adamson ............ G09G 5/363 715/760 |
| 2006/0232613 | A1 | 10/2006 | Matsuno |
| 2006/0236354 | A1 | 10/2006 | Sutardja |
| 2007/0204297 | A1 | 8/2007 | Gonzalez |
| 2007/0250901 | A1* | 10/2007 | McIntire .......... H04N 7/17318 725/146 |
| 2008/0048919 | A1 | 2/2008 | Jung |
| 2008/0231544 | A1* | 9/2008 | Cooper ............. G06F 3/1446 345/1.1 |
| 2009/0006972 | A1* | 1/2009 | Karlson ............ H04L 67/06 715/737 |
| 2009/0158198 | A1* | 6/2009 | Hayter ............. G06F 9/451 715/781 |
| 2009/0278985 | A1 | 11/2009 | Chan |
| 2011/0122048 | A1 | 5/2011 | Choi |
| 2012/0144347 | A1* | 6/2012 | Jo .................. G06F 3/04883 715/863 |
| 2013/0117692 | A1* | 5/2013 | Padmanabhan .... H04N 21/4126 715/753 |
| 2014/0109161 | A1 | 4/2014 | Chuang |
| 2014/0136935 | A1* | 5/2014 | Santillie ............ G06F 17/248 715/204 |
| 2014/0157163 | A1* | 6/2014 | Strutin-Belinoff ................ G06F 3/04883 715/769 |
| 2014/0159992 | A1* | 6/2014 | Cai ................ G06F 3/1446 345/2.3 |
| 2014/0245148 | A1* | 8/2014 | Silva ............... H04N 5/44591 715/719 |
| 2014/0304597 | A1 | 10/2014 | Einstein |
| 2015/0082201 | A1* | 3/2015 | Sung ............... H04L 12/1831 715/753 |
| 2015/0120817 | A1* | 4/2015 | Jeong ............... G06F 3/1454 709/203 |
| 2015/0187324 | A1* | 7/2015 | Kim ................ G06F 3/1446 345/1.3 |
| 2015/0312520 | A1 | 10/2015 | Nohria |
| 2015/0347078 | A1 | 12/2015 | Lu |
| 2016/0019017 | A1* | 1/2016 | Walker ............. H04N 5/765 348/553 |
| 2016/0073013 | A1 | 3/2016 | Prosserman |
| 2016/0266851 | A1 | 9/2016 | Kim |
| 2017/0238041 | A1* | 8/2017 | Alsante ........... H04N 21/4122 725/34 |

* cited by examiner

II. THE INVENTION CONTROL UNIT (130) CONTAINS A MOS APPLICATION SYNCHRONOUS DISPLAY MODULE (130E), MANAGED BY INVENTION CONTROL UNIT (130) SYSTEM OPERATIONAL SOFTWARE (130H), [FIGURE 9].

II.i THE MOS APPLICATION SYNCHRONOUS DISPLAY MODULE (130E) PROVIDES THE INVENTION SYSTEM THE CAPABILITY TO DISPLAY MULTIPLE USER MOS DEVICE (132A-E) APPLICATIONS ON MULTIPLE USER DISPLAY SCREENS (14-28) SIMULTANEOUSLY, AS SELECTED VIA BY MOS DEVICE APPLICATIONS (134A,B) AND FURTHER ALLOW THE USER TO INTERFACE WITH USER MOS DEVICE APPLICATIONS AS DISPLAYED ON USER DISPLAYS (14-28).

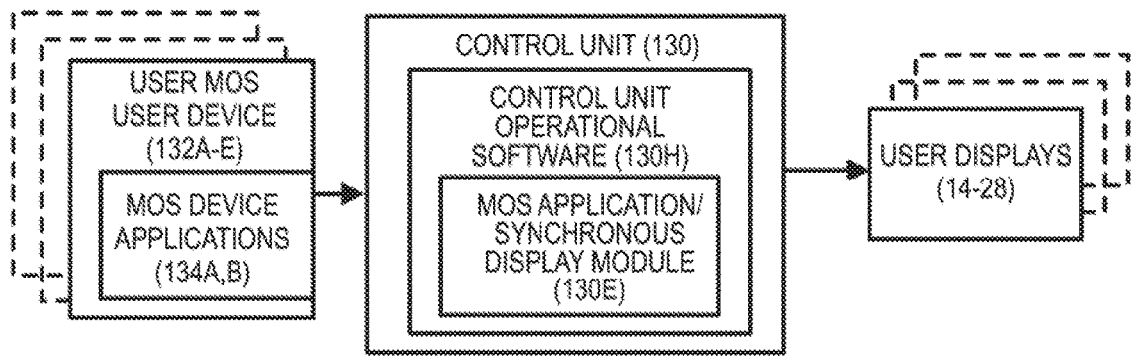

FIG. 9

II.ii USER DISPLAYS (14-28), MANAGED BY CONTROL UNIT (130), CAN BE LOCATED CONTIGUOUSLY OR REMOTELY AND USER SELECTED.

II.iii USER DISPLAYS (14-28), MANAGED BY CONTROL UNIT (130), CAN ALSO BE SHARED BETWEEN USERS, INVENTION, OPERATIONAL APPLICATION(134B), PROVIDED BOTH USERS HAVE THE INVENTION SYSTEM, AS DEPICTED BY FIGURE 20.

II.iv CONTROL UNIT (130), DISPLAY DRIVERS (130B), CONTROL UNIT OPERATIONAL SOFTWARE (130H) AND MOS APPLICATION DISPLAY MODULE SOFTWARE (130E) ARE CONFIGURED BY WEBSITE (X), VIA SELECTIONS MADE BY USER, REGARDING CONFIGURATION, VIA USER DEVICES (132A-E) SETUP APPLICATION (134 A) AND OPERATION APPLICATION (134B).

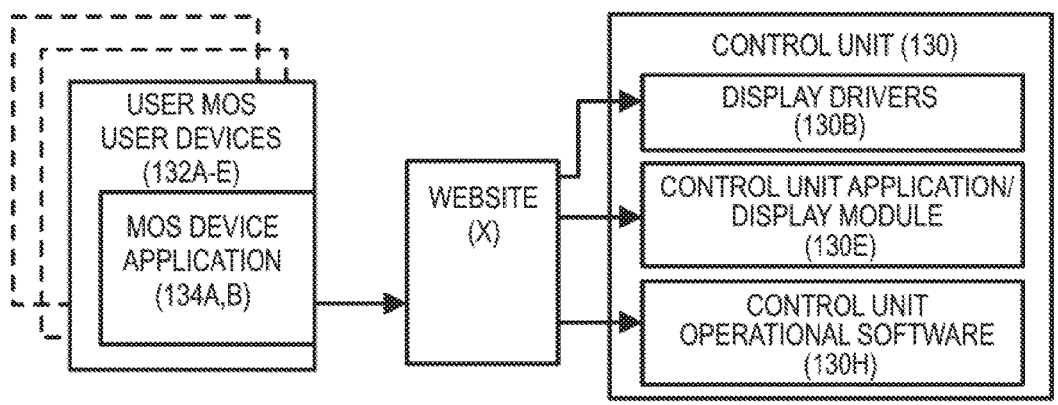

FIG. 10

II.v CONTROL UNIT (130) CONTAINS A "FASTPORT" MODULE (130M) (REF SECTION A.3.1) FOR RAPID UPLOAD/DOWNLOAD OF INFORMATION BETWEEN CONTROL UNIT (130), MULTIPLE USER DEVICE (132A-E) AND WEBSITE (X).

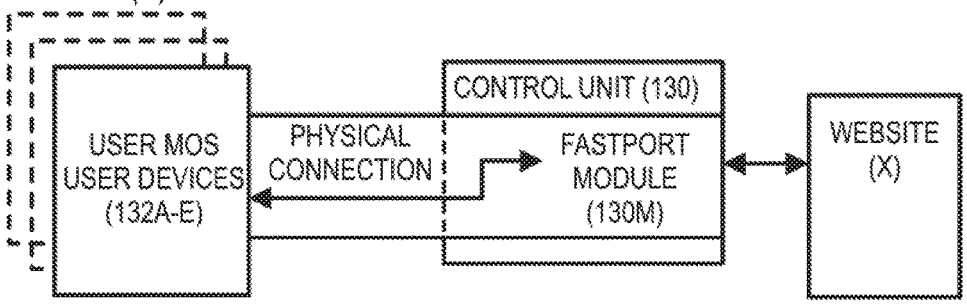

NOTE: PHYSICAL CONNECTION NOTED ABOVE ALSO CAPABLE OF CHARGING USER MOS DEVICES (132A-E)

FIG. 11

STEP 21.0
↓

22. EXECUTE STEPS 1.0 - 21.0 AS ILLUSTRATED BELOW FOR MULTIPLE DEVICES:

MULTI-DEVICE SETUP TABLE

| FUNCTION | STEP | SINGLE DEVICE REF: (132) | MULTIPLE DEVICE REF: (132B-132E) |
|---|---|---|---|
| USER DEVICE RECOGNITION | 1.0 | ✓ | ✓ |
| SETUP APPLICATION DOWNLOAD | 2.0 | ✓ | ✓ |
| CONTROL UNIT HANDSHAKE | 3.0 | ✓ | ✓ |
| INITIATE SYSTEM CONFIGURATION | 4.0 | ✓ | ✓ |
| DISPLAY CONFIGURATION | 5.0 | ✓ | X |
|  | 6.0 | ✓ | X |
|  | 7.0 | ✓ | X |
| DISPLAY DRIVER CONFIGURATION | 8.0 | ✓ | X |
|  | 9.0 | ✓ | X |
|  | 10.0 | ✓ | X |
| PHONE APPLICATIONS CONFIGURATION | 11.0 | ✓ | ✓ |
|  | 12.0 | ✓ | ✓ |
|  | 13.0 | ✓ | ✓ |
|  | 14.0 | ✓ | ✓ |
|  | 15.0 | ✓ | ✓ |
|  | 16.0 | ✓ | ✓ |
|  | 17.0 | ✓ | ✓ |
| EXTERNAL DEVICE CONFIGURATION | 18.0 | ✓ | X |
|  | 19.0 | ✓ | X |
|  | 20.0 | ✓ | X |
|  | 21.0 | ✓ | X |
| DOWNLOAD OPERATION APPLICATION (134B) | 21.1 | ✓ | ✓ |

MULTIPLE DEVICE SETUP REF: 4.6

REF: 4.7

STEP 23.0 - USER CONFIRMS SUCCESS FOR MULTIPLE DEVICE CONFIGURATION VIA USER DEVICE (134) APPLICATION (134A), AND APPLICATION (134A) PROMPTS INVENTOR WEBSITE (X) TO DOWNLOAD CONTROL UNIT (130) OPERATION SW (130H) COMPLETING THE SYSTEM SETUP PROCESS

USER DEVICE (132)
SETUP APPLICATION (134A)
↓
INVENTOR WEBSITE (X)
↓
OPERATION SW (130H)
↓
CONTROL UNIT (130)

SETUP COMPLETE

FIG. 13E

CONTROL UNIT EXTERNAL DEVICE PORT MANAGEMENT AND SETUP

CONTROL UNIT COMMUNICATIONS (130, 130F)

| | TYPE: | PORTS | PURPOSE OF |
|---|---|---|---|
| 1.0 DEVICE PORT/PARK (130M) "FASTPORT" REPRESENTED TO BE A CONTINUOS PART OF CONTROL UNIT (130), TO ACCEPT USER DEVICES (134A-E) FOR THE | 1.1 USER DEVICE TYPE 1<br>1.2 USER DEVICE TYPE 2 | 4<br>4 | >INVENTOR WEBSITE "FASTPORT"<br>• EXPEDITE USER DEVICE ADD<br>• DATA, SYNC RECOVERY<br>• QUICK LINK<br>>CHARGING |

USER -SETUP PORTS

| | | | |
|---|---|---|---|
| 2.0 CAMERA | CABLE<br>BLUETOOTH | 2<br>2 | SKYPE<br>HOME SECURITY |
| 3.0 SPEAKER | CABLE<br>BLUETOOTH | 2<br>2 | SKYPE/COMMUNICATION<br>GAMING - COMMUNICATIONS<br>MUSIC |
| 4.0 GAME PORT | CABLE | 2 | GAMING DISPLAY |
| 5.0 MICROPHONE | CABLE<br>BLUETOOTH | 1<br>2 | GAMING COMMUNICATIONS<br>SKYPE/COMMUNICATIONS<br>HOME COMMUNICATION<br>(W/F DISPLAY ENVIRONMENT) |
| 6.0 COMPUTER | CABLE | 1 | DISPLAY INTERFACE |
| 7.0 VCR | CABLE - TYPE 1<br>CABLE - TYPE 2 | 1<br>1 | MOVIES |
| 8.0 KEYBOARD<br>9.0 MOUSE | CABLE/BLUETOOTH<br>CABLE/BLUETOOTH | 1<br>1 | KEYBOARD<br>MOUSE |

FIG. 17

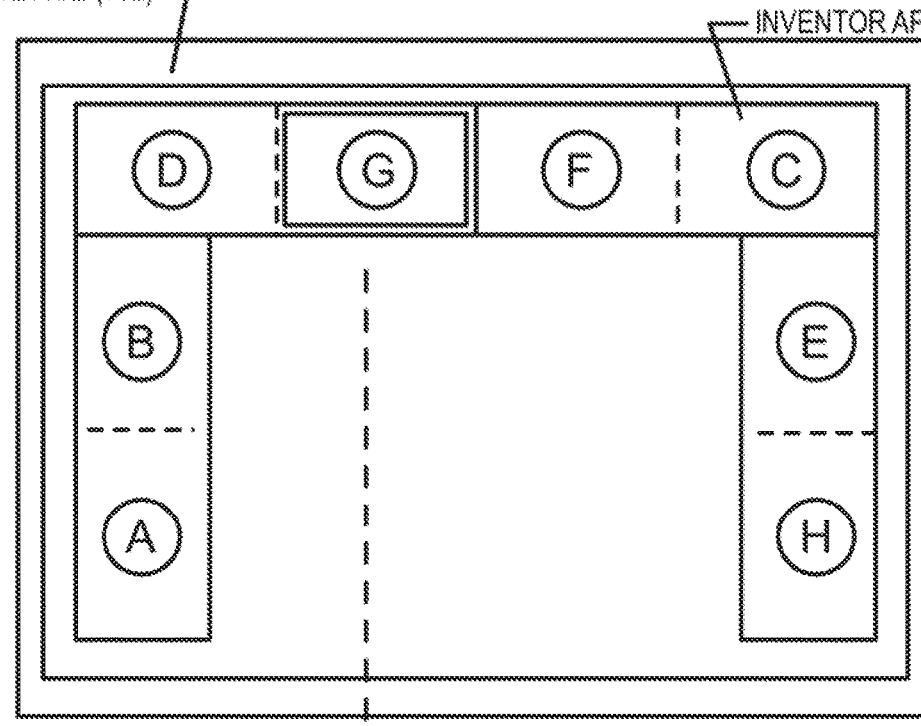
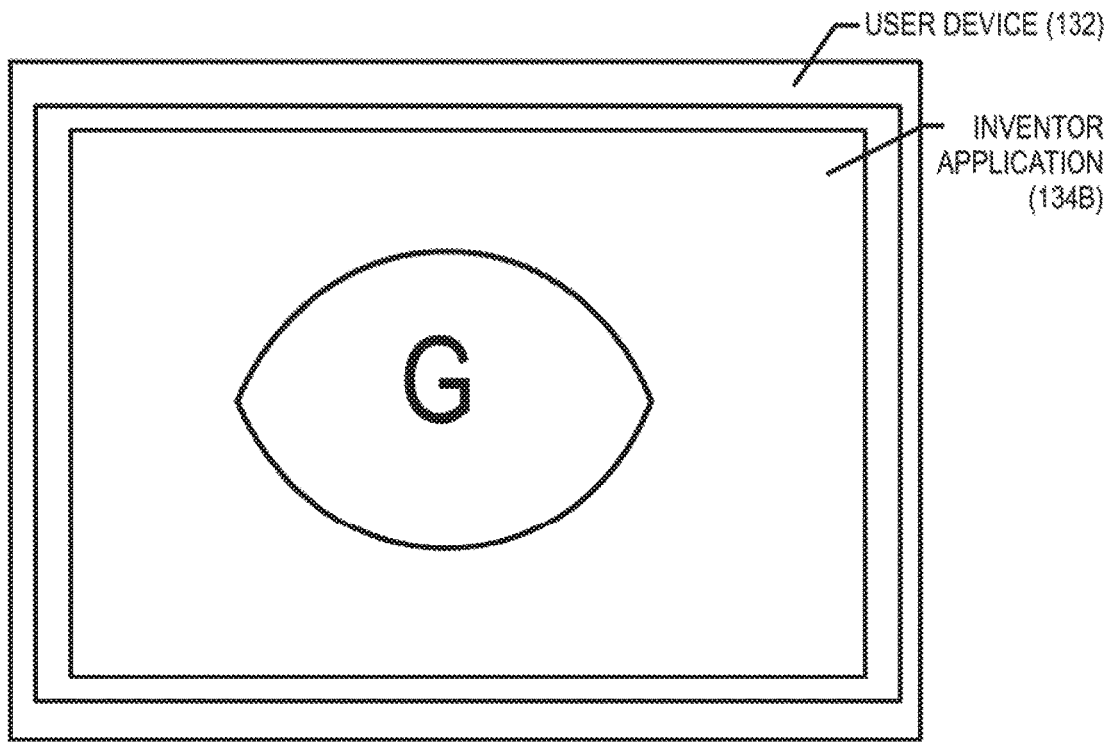
FIG. 23

SYSTEM UPDATE SETUP OPTIONS (CONTINUED)
USER SYSTEM USER DEVICE APPLICATIONS UPDATE/ADD

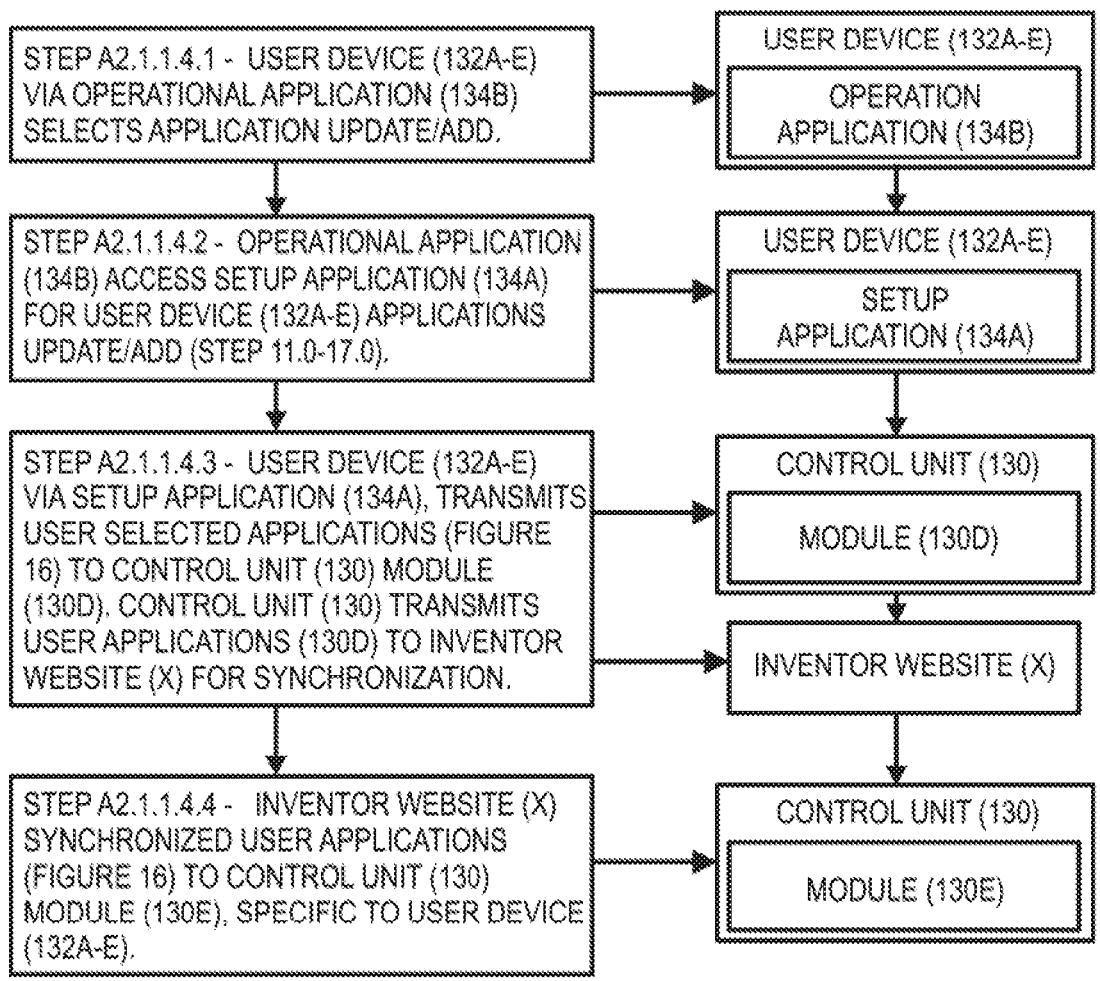

FASTPORT (130M)

A.3.1 "FASTPORT" PROVIDES FOUR (4) CHANNEL, ACCOMMODATING MULTIPLE PORTS FOR DATA INPORT/EXPORT TO INVENTOR WEBSITE (X) AND CHARGING USER DEVICES (132A-E).

A.3.2 - THE "FASTPORT" CAPABILITY, OF CONTROL UNIT (130), PROVIDES THE CAPABILITY TO:

A.3.2.1 TRANSMIT & RECEIVE DATA FROM WEBSITE (X) AT HIGH SPEED

A.3.2.2 CHARGE USER DEVICES (132A-E)

A.3.2.3 SHARE BANDWIDTH WITH CONTROL UNIT (130) AS DEEMED
          PRUDENT BY CONTROL UNIT (130) OPERATING SW (130M)

FIG. 25C

CONSUMER ELECTRONIC ENTERTAINMENT AND DISPLAY SYSTEM

CROSS-REFERENCE TO RELATED APPLICATION AND PRIORITY

This continuation-in-part application claims priority from U.S. Provisional Patent Application No. 62/296,346, filed Feb. 17, 2016 and to U.S. patent application Ser. No. 15/433,403, filed Feb. 16, 2017, the contents of which are incorporated into this application by reference.

TECHNICAL FIELD AND BACKGROUND OF THE INVENTION

This invention relates to a user-friendly consumer electronic entertainment and display system designed to supplement or enhance a viewer's existing or future primary display such as a television, monitor or other flat screen display. The invention has particular application with regard to simultaneous viewing of supplied audio/video programming such as supplied by broadcast, cable, satellite or internet streaming suppliers. Those aspects are in combination with customized supplementary audio/video programming created by or for the viewer and containing viewer-specific material. The supplementary programming material may be displayed on additional, secondary video displays positioned in a predetermined location proximate the primary display.

This invention also enhances a viewer's existing or future primary display such as a television, monitor or other flat screen display by providing the consumer the opportunity to readily and easily view multiple website and/or smart phone and tablet media. This invention takes advantage of improvements in video displays and smart phone tablet media to provide a unique home entertainment experience. This invention also takes advantage of improvements in video displays and the increasing availability of robust, high definition, high-speed internet systems capable of transmitting very large amounts of high definition digital data at high transfer rates. As used in this application, certain terms have the following meanings unless specifically stated otherwise:

Display information: an electronic media capable of being displayed on the electronic display system displays and electronic information exported to or downloaded from peripheral equipment connected to a display system control unit such as speaker, camera, microphone, gaming system, video and music system.

Real time: input, which is processed at or near the time when the event occurs so that it is available virtually immediately.

Static or Statically: constant data showing no change.

Internet: the worldwide global communication network that allows wired or wirelessly-connected computers, pads, tablets, cameras, game boxes, phones and other digital devices to connect and exchange information.

While there exists prior art directed generally to the concept of synchronizing a plurality of screen devices, the functionality of the prior art is different and does not teach or suggest the invention disclosed and claimed in this application. The Sharma U.S. Pat. No. 9,553,927 discloses a means for providing supplemental content that is synchronized with the primary content users are watching. Sharma refers to the one or more second screen devices that connect to the user via a local office but does not specify how content for the second screen is sourced or identified by the user, and/or how a plurality of second screen devices are distinguished and/or selected by the user.

The Bryczkowski Published United States Patent Application 2002/0116539A1 discloses a large scale display system that includes a plurality of computing devices, namely, a control computer, a display computer, one or more source computers refers to the capability to run and display multiple user device applications on multiple and selectable user displays. The control is achieved by use of a large scale display system, paragraph [0006] or a KVM (keyboard, monitor, mouse) system. Bryczkowski refers to a plurality of computing devices but does not incorporate the capability to run multiple mobile operating system applications via a mobile operating system device application to selectable multiple displays.

The Cai Published United States Patent Application US 2014/0159992A1 discloses a portable display wall adjusting device transmits the control information to the display apparatus to enable the display parameters of at least one of the displays . . . " Cai asserts the capability to run and display multiple user applications on multiple and selectable user displays using a user device application and a control unit. Cai refers to an adjustment to a singular display source but does not incorporate the capability to run multiple mobile operating system applications via a mobile operating system device application to selectable multiple displays.

The Choi Published United States Patent Application US 2011/0122048A1 discloses a plurality of display devices that are connected through a plurality of the pairs of input and output connectors, so that the image signal input to the first display device may be transmitted to another display device. Choi refers to an adjustment to a singular display source but does not incorporate the capability to run multiple mobile operating system applications via a mobile operating system device application to selectable multiple displays.

The Klumpp Published United States Patent Application US2002/0092025AI Choi refers to information received via a mobile communications terminal to a fixed output device . . . " Klumpp refers to a general mobile communication terminal but does not specifically reference the capability to run multiple mobile operating system applications via a mobile operating system device application to selectable multiple displays.

SUMMARY OF THE INVENTION

It is therefore an object of the present invention to provide an entertainment system that includes one or more proximate secondary displays to provide an interactive, and/or static audio and/or video display of the consumer's choosing able to supply supplementary programming material from the user mobile operating system device via an mobile operating system application.

It is another object of the invention to provide an entertainment system that allows multiple applications of the users choosing to simultaneously run and display on selectable one or more secondary displays.

It is another object of the invention to provide through a dedicated website, supplementary programming material to the electronic displays in real time.

It is another object of the invention to provide supplementary programming material through an electronic display system control unit to one or more secondary electronic displays. It is another object of the invention to provide, through an electronic display system control unit, the capability to receive and transmit information from the viewer to a dedicated website or to the internet.

It is another object of the invention to provide, through a control unit, the simultaneous and independent control and/or interaction with the media selected by the consumer to be displayed onto the commercially available displays.

It is another object of the invention for the control unit to be able to accept and incorporate the display drivers of the commercially available displays within the control unit, to allow communication of the consumer-chosen display media independently and simultaneously to each of the displays.

It is another object of the invention to communicate to the control unit the display media via the consumer's existing WI-FI and/or Bluetooth® interface.

It is another object of the invention to leverage the consumer's existing smart phone and/or tablet or other input device to communicate multiple and simultaneously active display media to the independently operating displays, as chosen by the consumer.

It is another object of the invention to provide a smart phone and/or tablet application, which can be downloaded onto the consumer's smart phone and/or tablet, to provide a diagrammatic image of the entertainment system in order to allow them to drag and drop consumer-selected internet, tablet and/or smart phone media onto the display as desired.

It is another object of the invention to provide the capability, via a smart phone and/or tablet application, to freeze the media on the consumer's displays and hold that display media on the display on the consumer-chosen display.

It is another object of the invention to allow the consumer's tablet and/or smart phone application display configuration to be downloaded to the system control unit, to accept and store the consumer's tablet and/or smart phone application display configuration to support the independent, simultaneous and active communication to the control unit, for export to the displays and to readily facilitate, as necessary, the consumer's selected media onto the displays.

It is another object of the invention to allow multiple user mobile operating system devices the capability to select and display media simulataneously on unique displays. It is another object of the invention to allow external devices to be configured to the control unit for selectable and real time engagement by the user, as selected by the mobile operating system application.

It is another object of the invention to provide an optional home entertainment frame, which readily accepts the control system and all associated wiring.

These and other aspects of the invention are achieved by providing an electronic entertainment and display system that include a website, mobile operating system application and control unit, whereby single or multiple displays and external devices are connected and configured to a control unit to allow for selectable and simultaneous viewing and interaction with multiple user mobile operating system applications, on the single or multiple displays, to additionally include content accessed via the users mobile operating system web service application; and to allow the external devices configured to the control unit to be selectable to the displays and/or be activated, for non display external devices, as selected by the user, via the mobile operating device application. According to another preferred embodiment of the invention, the input device is a smartphone-type input device that includes a touch display screen.

According to another preferred embodiment of the invention, the touch display screen of the input device includes a diagrammatic representation of the displays configured to the control unit, to receive the media as for selection by the user for display and/or interaction; and the external devices configured to the control unit for display and or activation as deemed by the external device. The touch display screen of the input device is operative to permit the mobile operating system application and or external device media to be dragged and dropped into the diagrammatic representation of the configured displays for simultaneous real time viewing by the user.

According to another preferred embodiment of the invention, an interactive handheld user input device is adapted for permitting at least on user to interact with a previously selected and displayed media in real time based on user selections.

According to another preferred embodiment of the invention, an interactive handheld user input device is provided and is adapted for permitting a primary user to allow a secondary a secondary user to access and control a portion of the displays configured by the system.

According to another preferred embodiment of the invention, an interactive handheld user input device is provided and is adapted for permitting a primary user to allow a secondary user using a secondary, unique and remote electronic entertainment and display system, to dedicate at least one or multiple displays configured to the primary user's system to view specific content as selected by the secondary user having the mobile operating system application. According to another preferred embodiment of the invention, an interactive handheld input device is adapted for permitting a primary user or secondary user to select external audio devices, the particular capability of the external device.

According to another preferred embodiment of the invention, an interactive handheld user input device is provided and is adapted for permitting the user add/delete/update initial user configuration.

According to another preferred embodiment of the invention, a battery charger is adapted to charge a plurality of devices.

According to another preferred embodiment of the invention, an interactive handheld user input device is adapted for permitting the user the capability to select control unit data/configuration characteristics.

According to another preferred embodiment of the invention, an interactive handheld user input device is adapted for permitting the user to name and store at least one user display configuration for future user selection and display configuration on either the website or the control unit.

According to another preferred embodiment of the invention, an interactive handheld user input device is adapted for permitting the user to name and store user device media on a unique user account on the website to allow the user to access the website to add/delete/update user account media, and to allow the user to download media to a user device selected by the user.

According to another preferred embodiment of the invention, an interactive handheld user input device is adapted for permitting the user to configure one or more displays within a predetermined distance from the control unit.

According to another preferred embodiment of the invention, an electronic entertainment and display system is provided and includes a website containing digital audio and video digital user content and display system operation data and at least one primary video display adapted to display primary user selectable audio and video digital content downloaded from the website. A plurality of secondary video displays is provided wherein at least one of the plurality of secondary video displays positioned in viewing proximity to the primary video display and is adapted to receive and display supplemental video digital information for simultaneous real time viewing with the primary display by a viewer. A control system is operatively connected to both the primary display and the plurality of secondary video displays for controlling the operation of the system. The control system includes a receiver unit operatively associated with the at least one secondary video display for displaying received video transmissions and a wireless user-controllable transmitter unit for transmitting video data instructions to the receiver unit for displaying video data on the at least one secondary video display, wherein the control unit is adapted to receive wireless video and audio data from an internet-enabled wireless input device. An interactive handheld user input device is provided and is adapted for permitting at least one user to download and utilize the display system operation data to select primary and secondary audio and video digital information for viewing.

According to another preferred embodiment of the invention, at least one of the secondary video displays is positioned remotely from the primary video and is wirelessly connected to the control system for simultaneous real time viewing by a user at a location remote from a location of the primary video.

BRIEF DESCRIPTION OF THE DRAWING FIGURES

The present invention is best understood when the following detailed description of the invention is read with reference to the accompanying drawings, in which.

Figure 6:
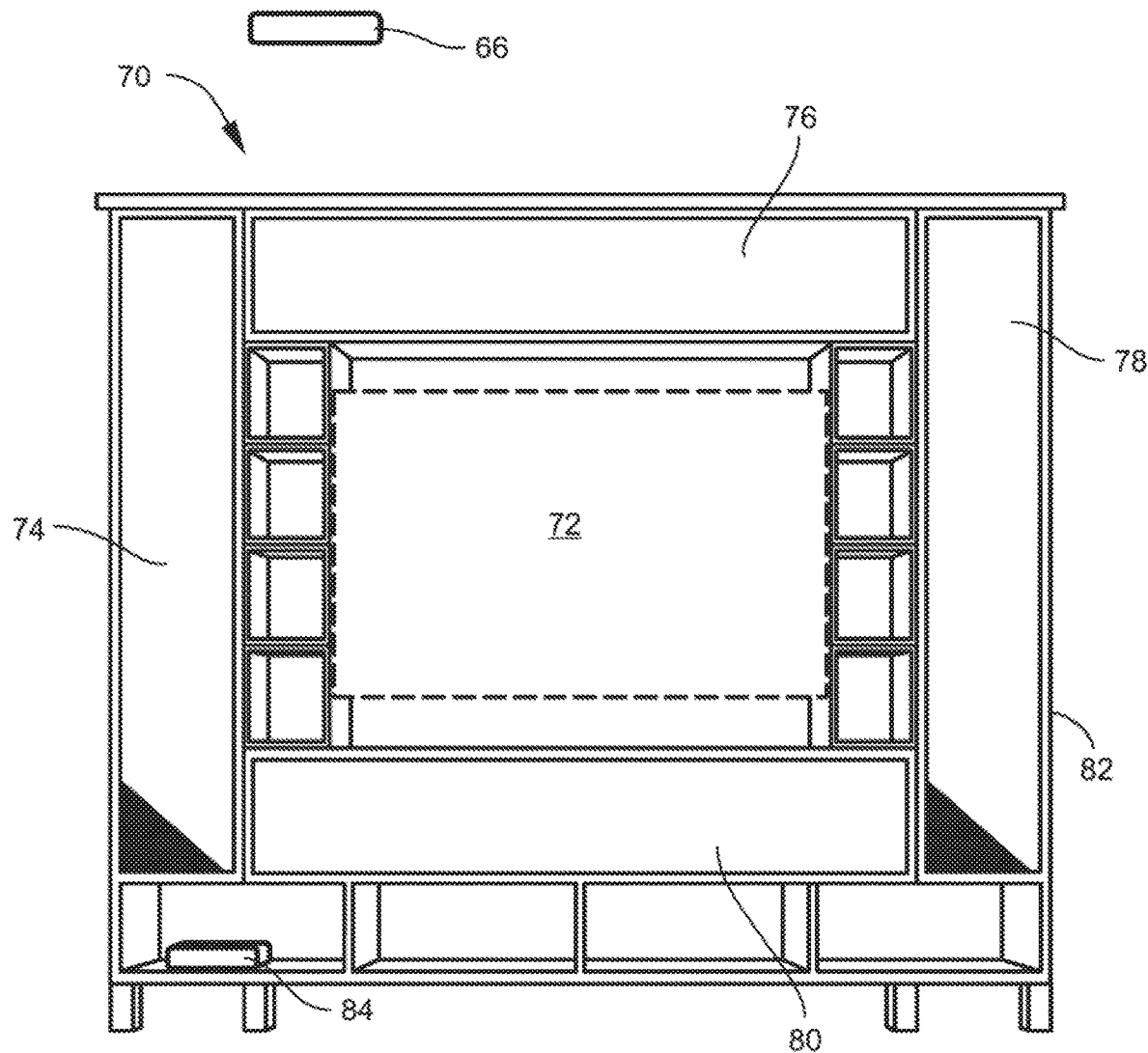
Figure 7:
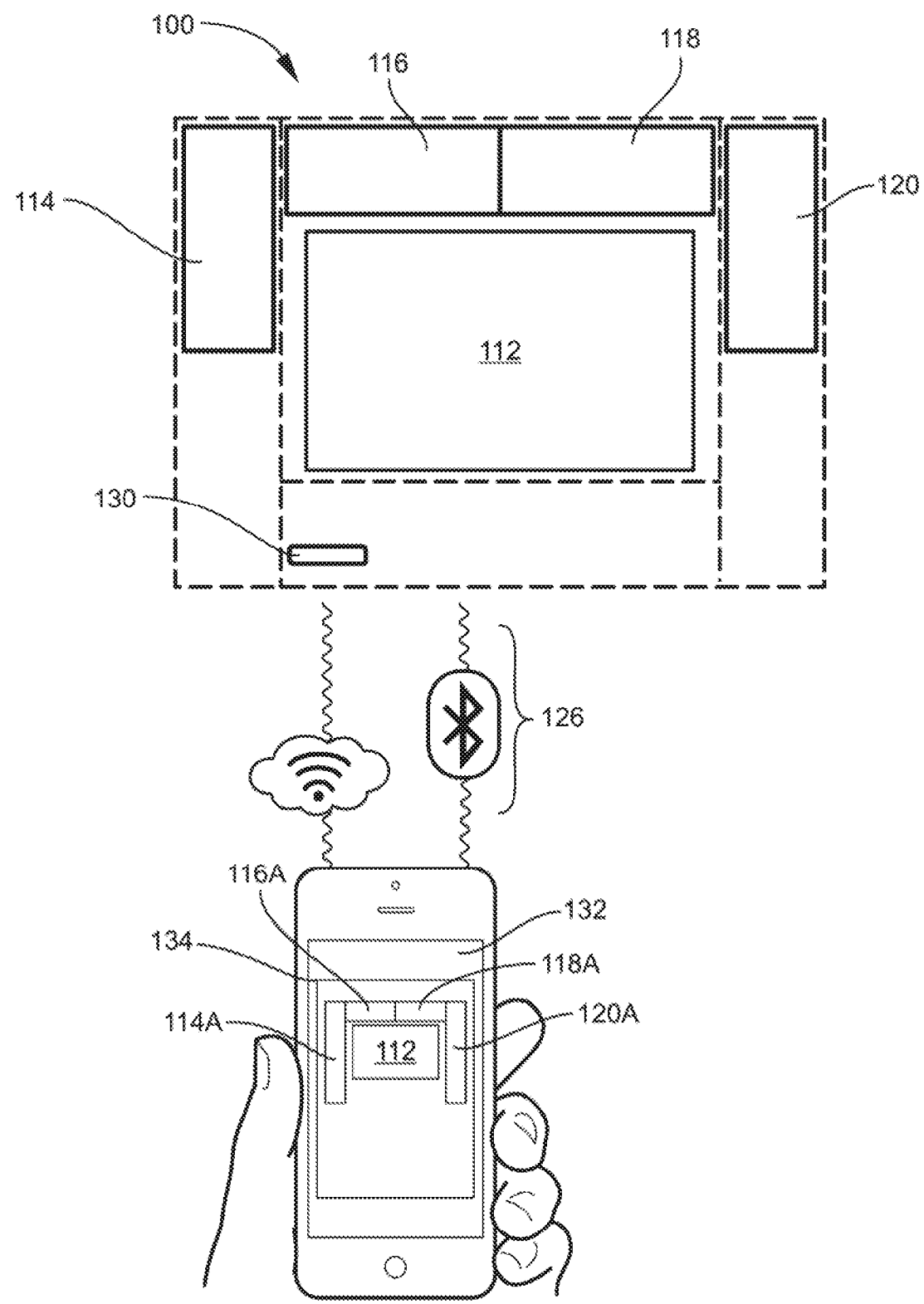

FIG. 6 is a schematic representation of a consumer electronic entertainment and display system according to an embodiment where there are four secondary displays positioned around a centrally-positioned user display, such as a television, which may or may not be configured to the control unit and including other home entertainment components positioned between the secondary displays and the centrally-positioned primary display; and FIG. 7 represents a representation of the physical layout of one preferred embodiment of the invention, showing wireless control via two of several wireless protocols.

Figure 8:
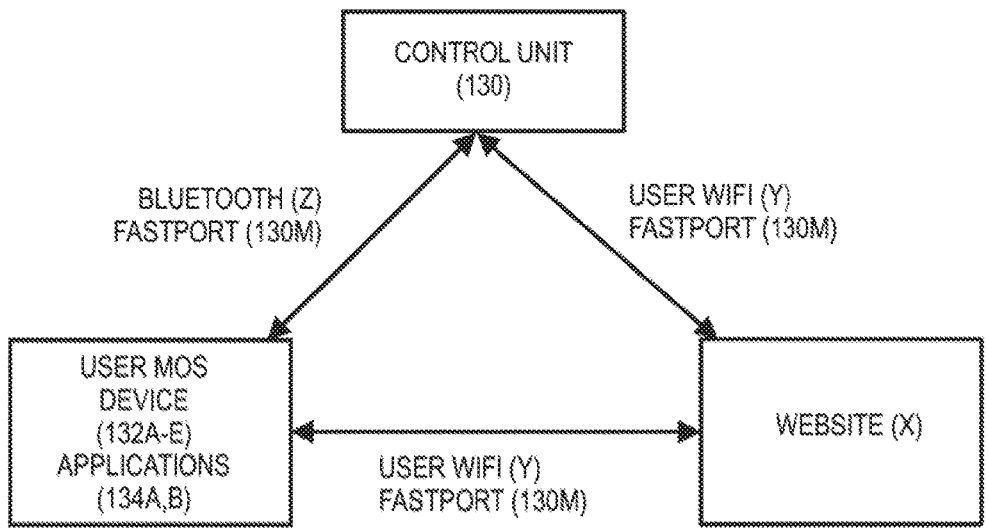
Figure 12:
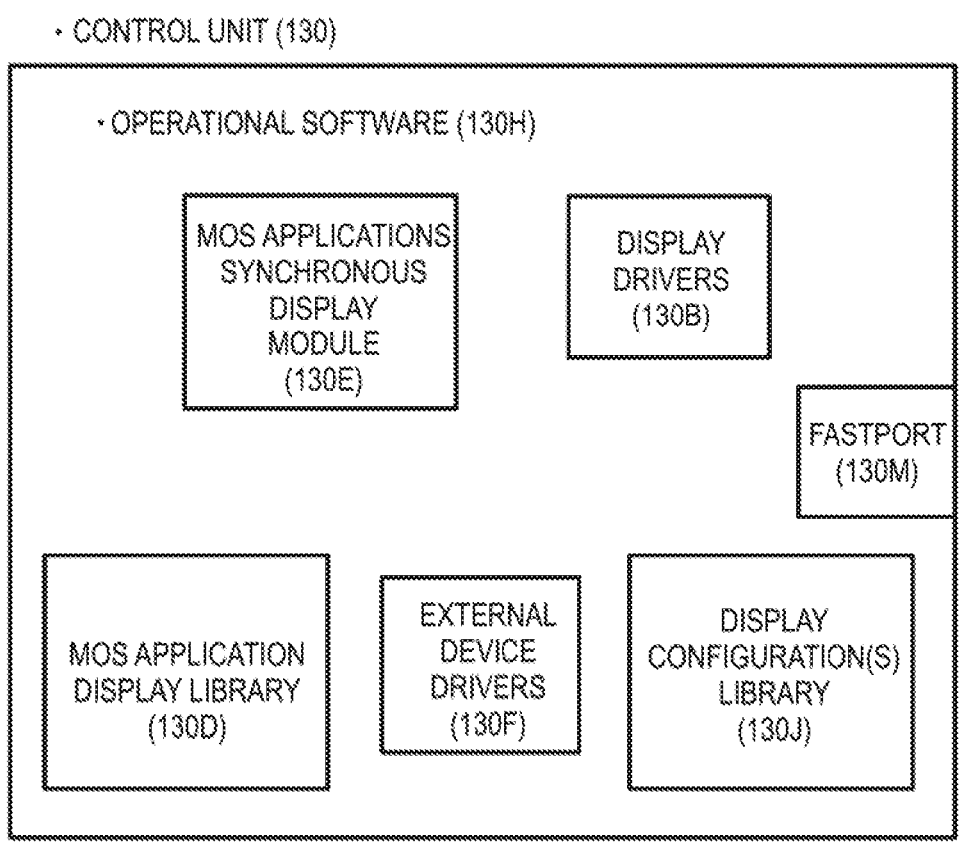
Figure 13A:
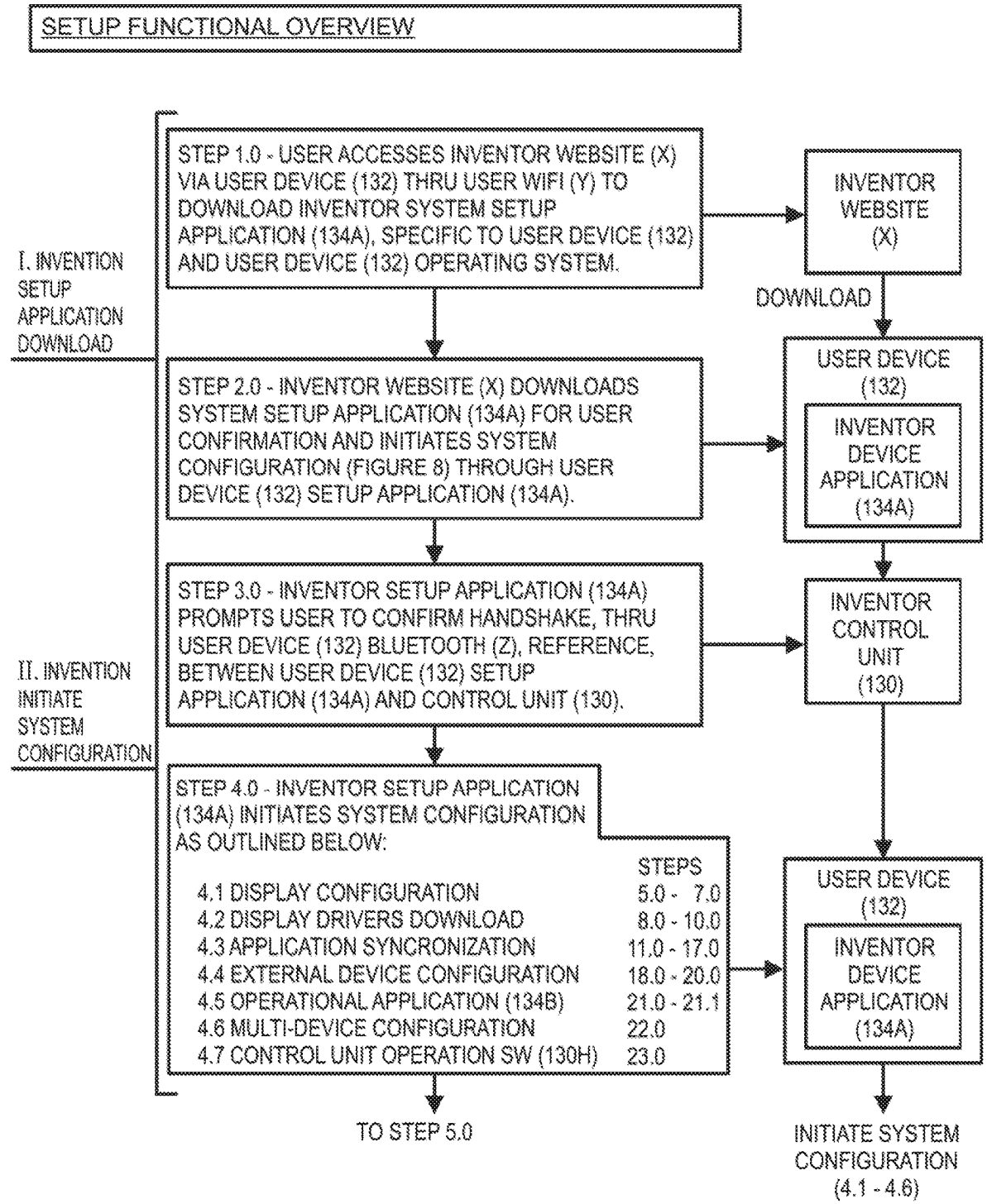
Figure 13B:
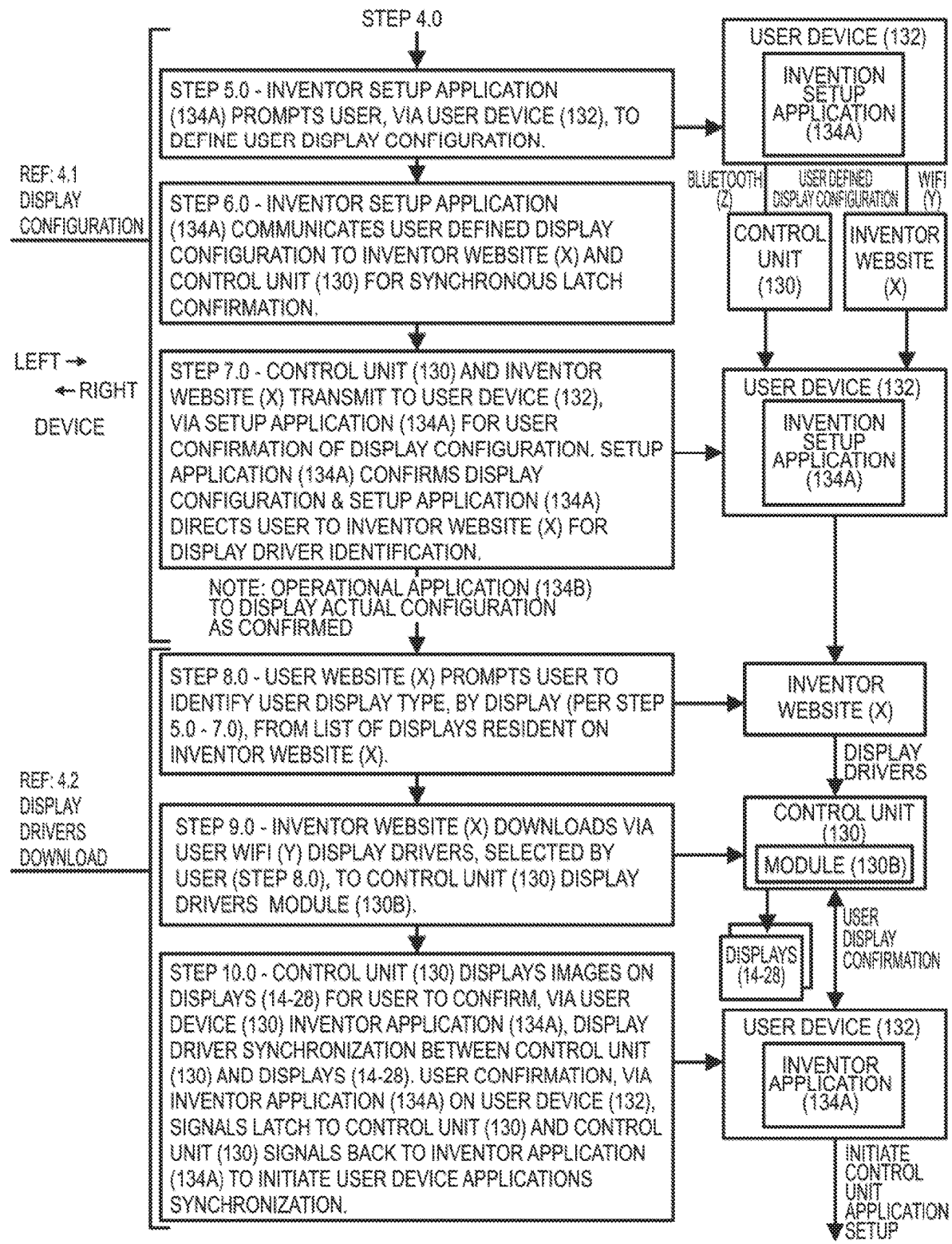
Figure 13C:
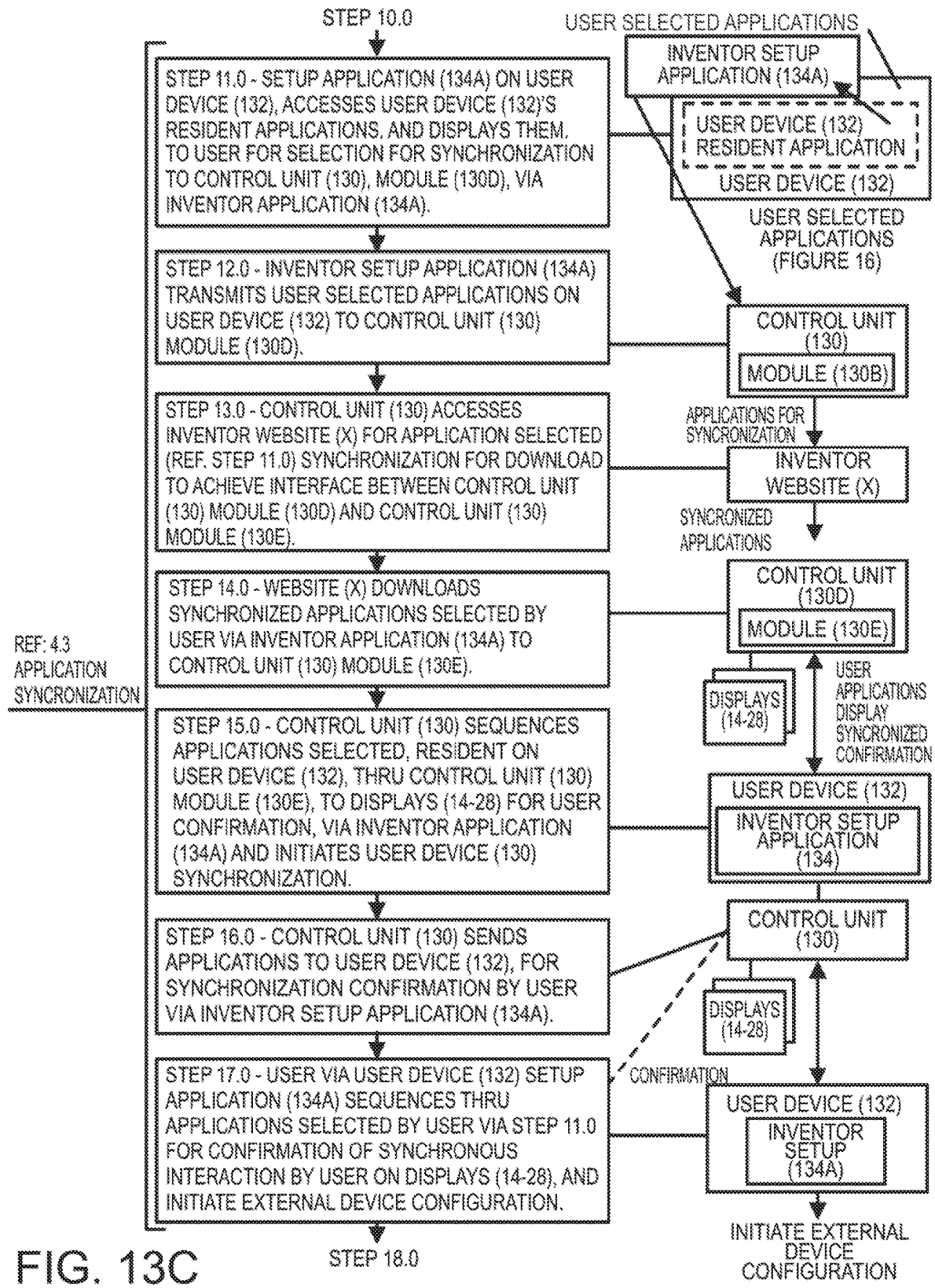
Figure 13D:
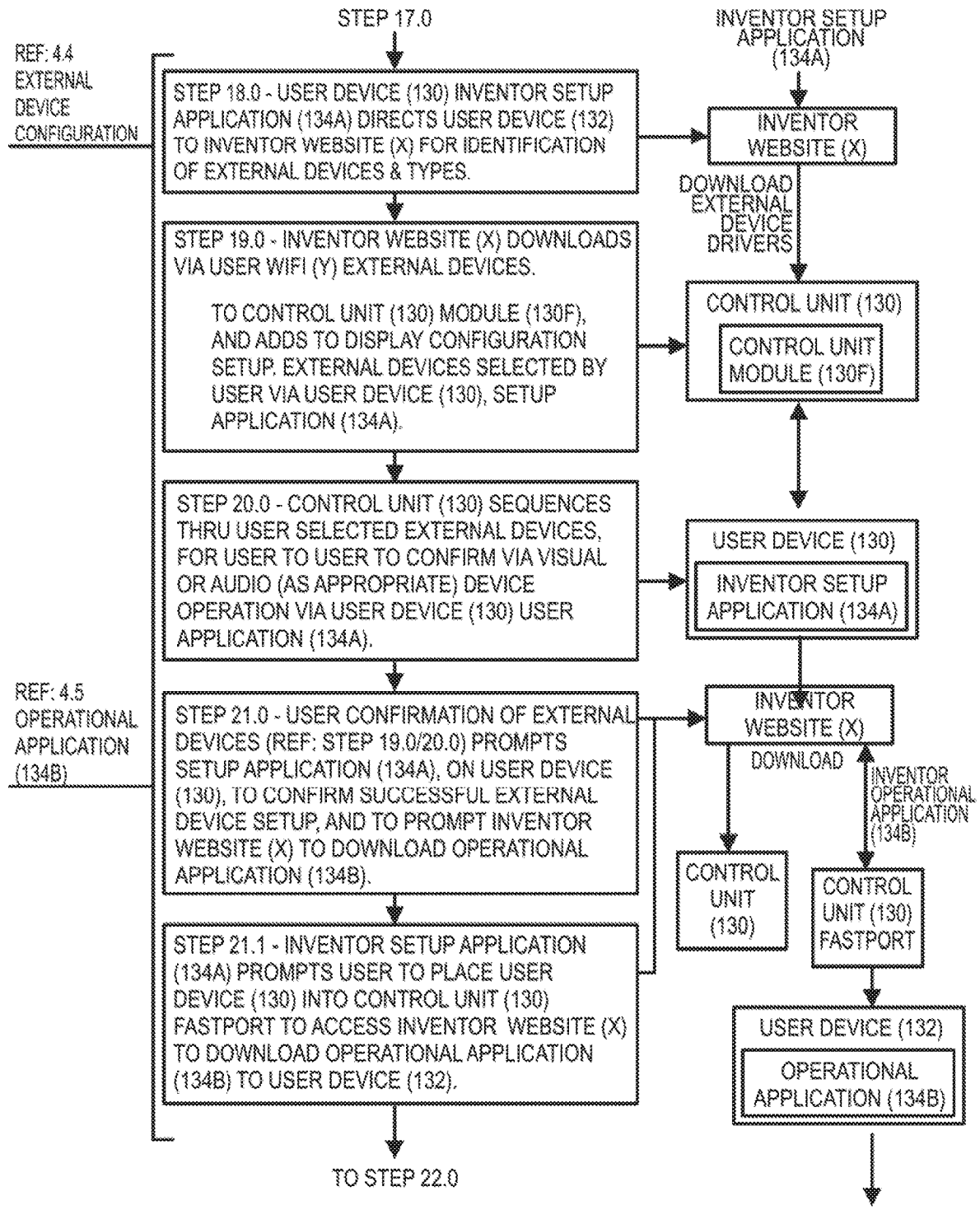
Figure 14:
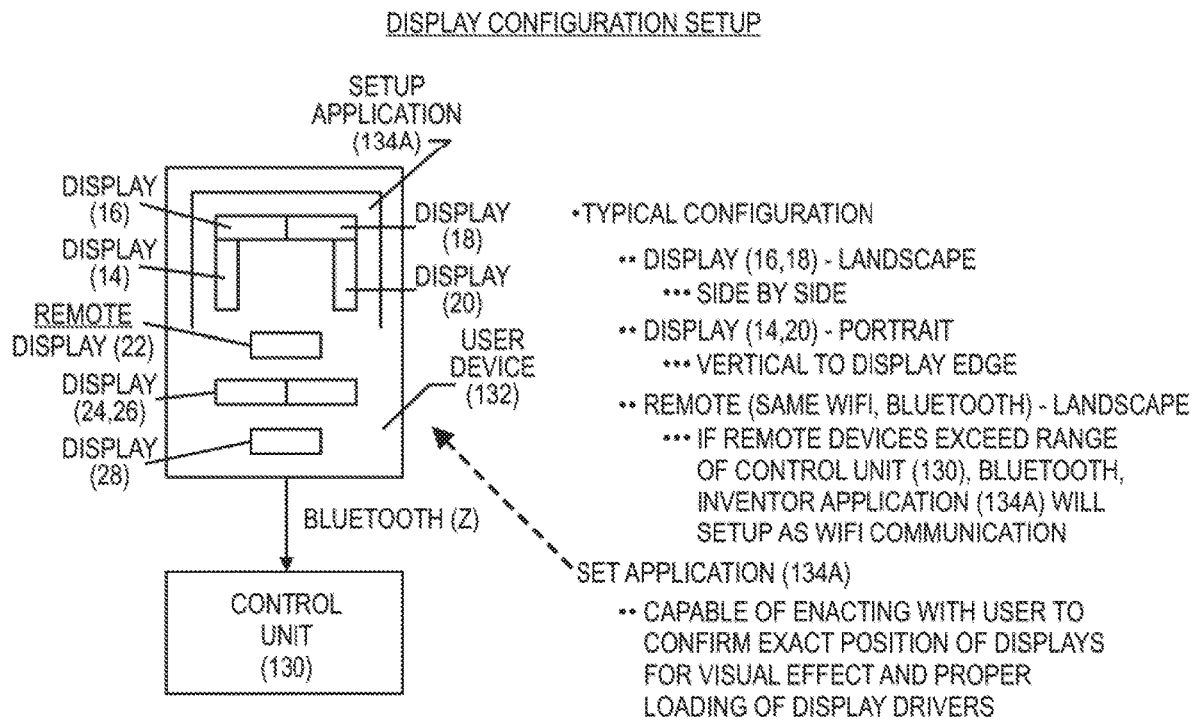
Figure 15:
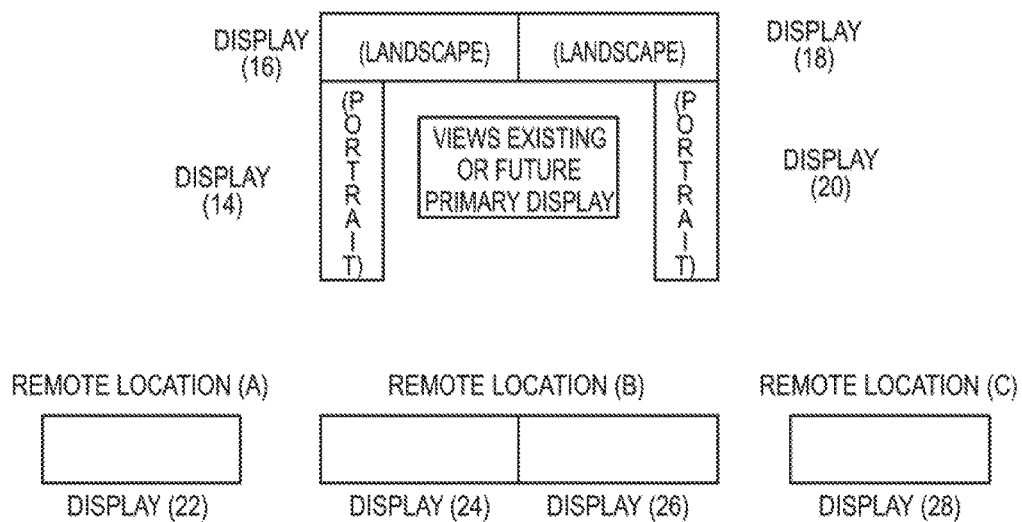
Figure 16:
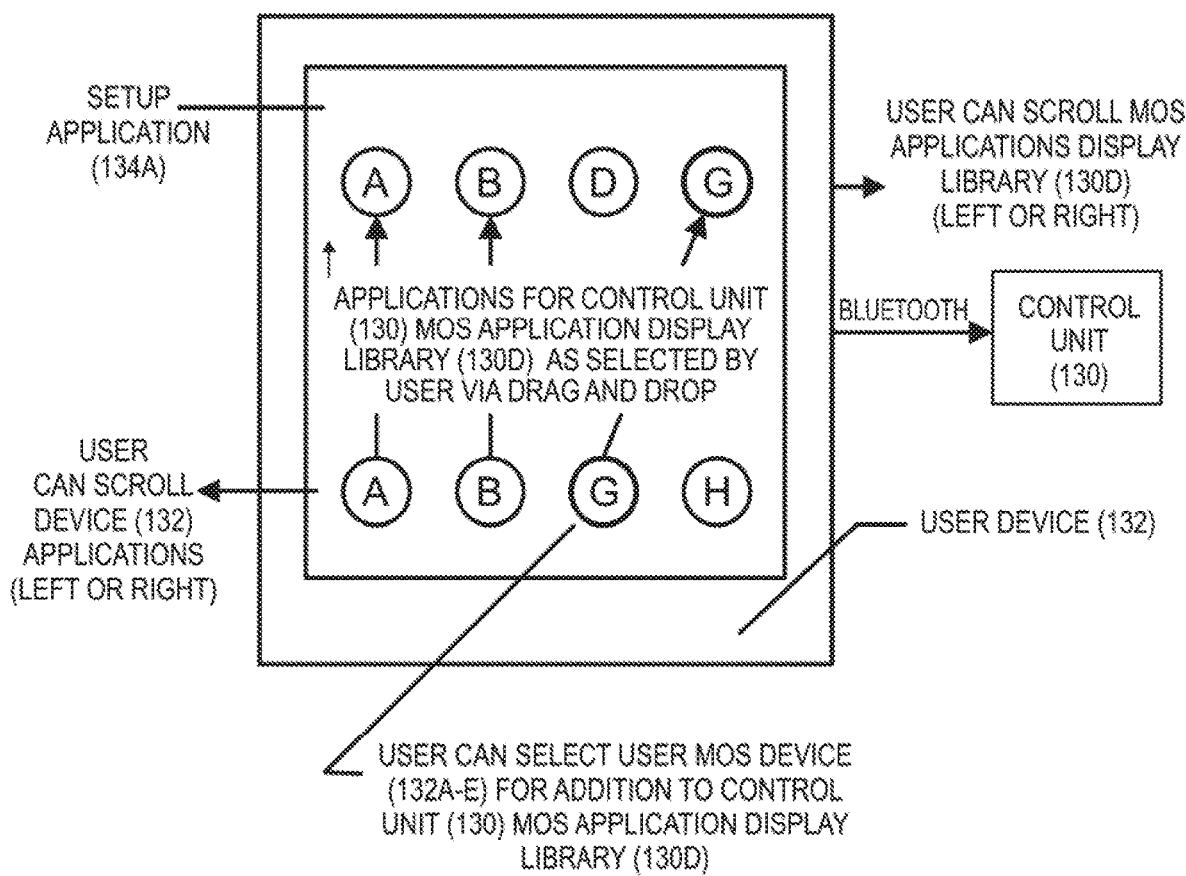
Figure 18:
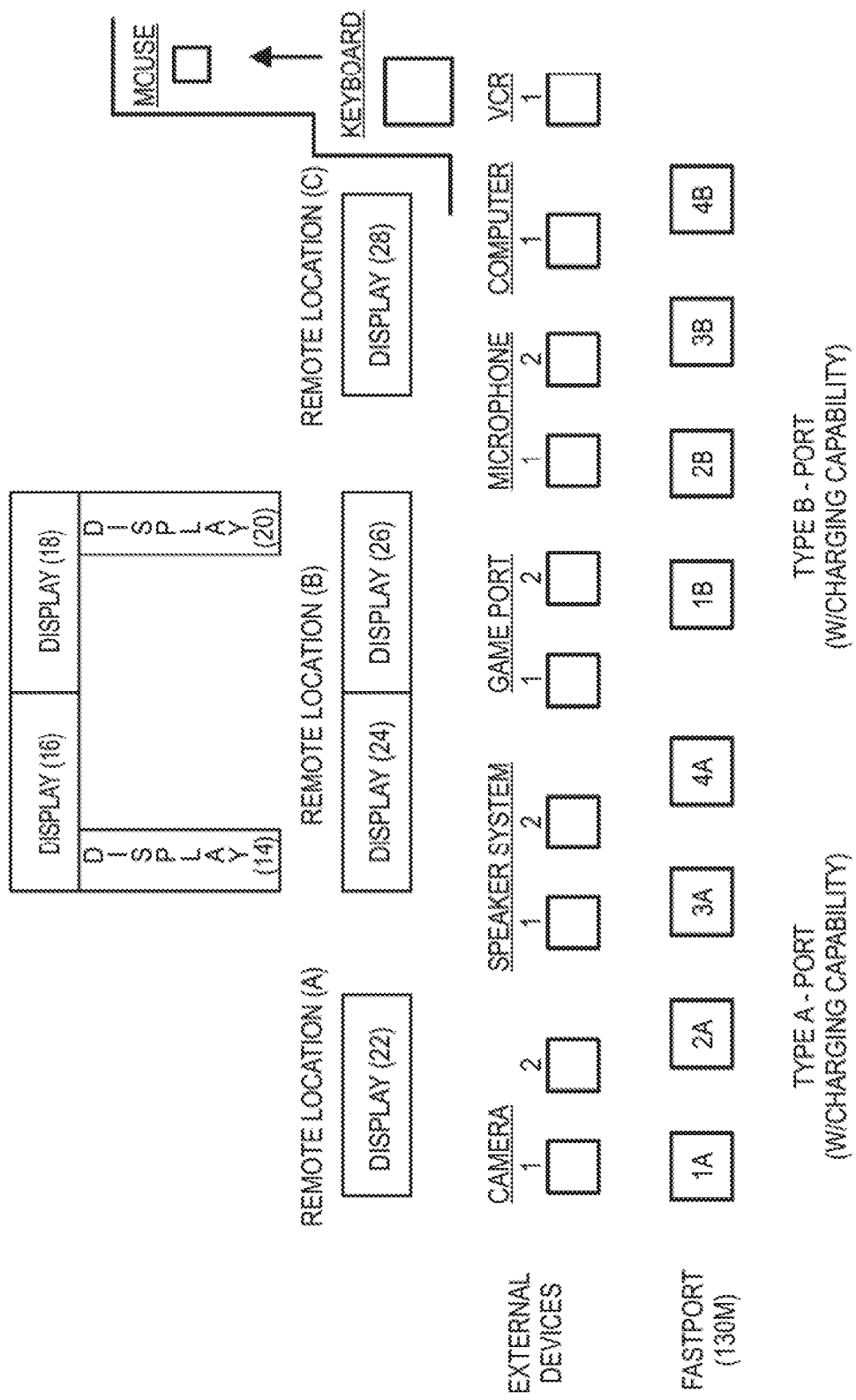
Figure 19:
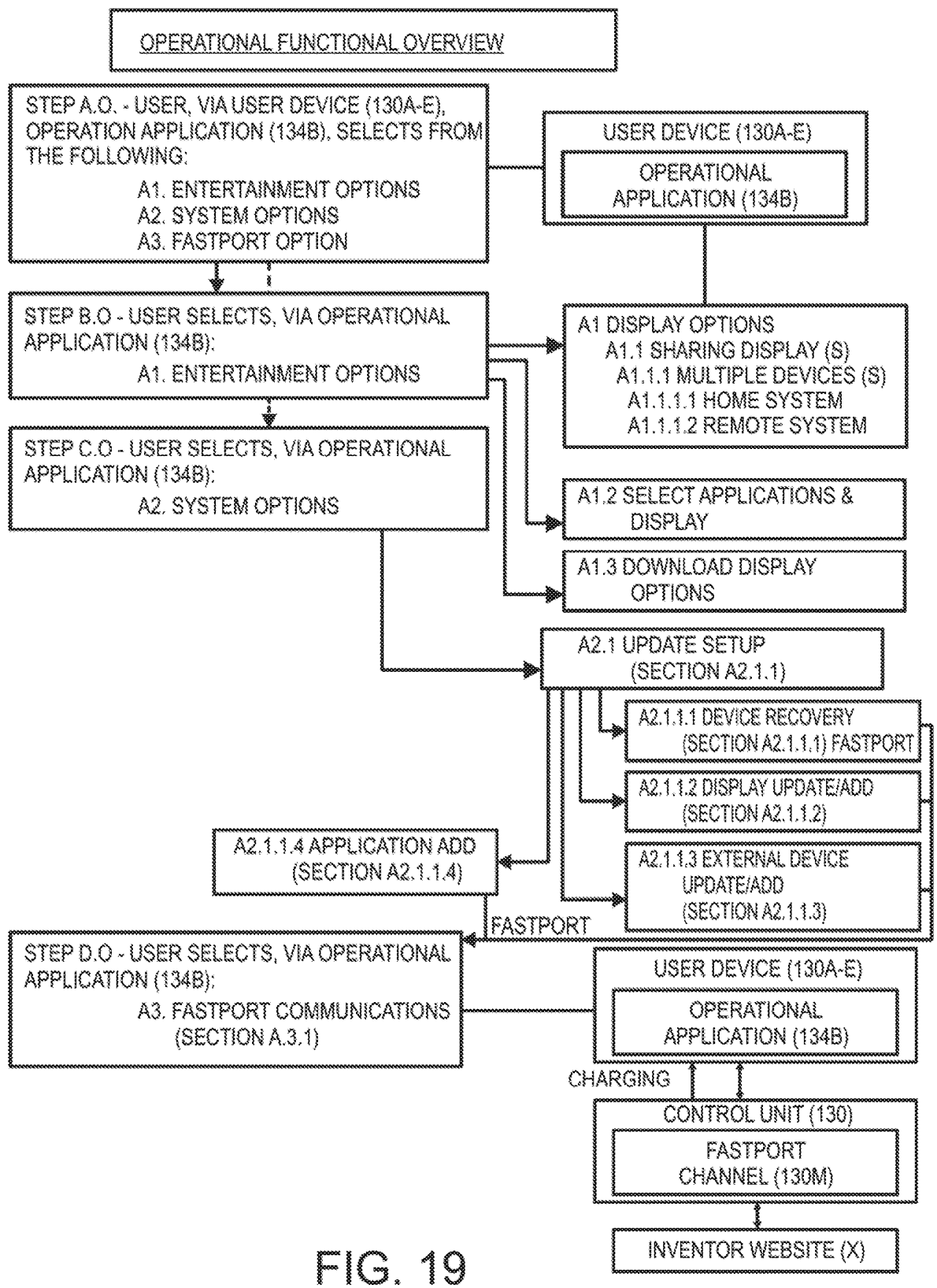
Figure 20:
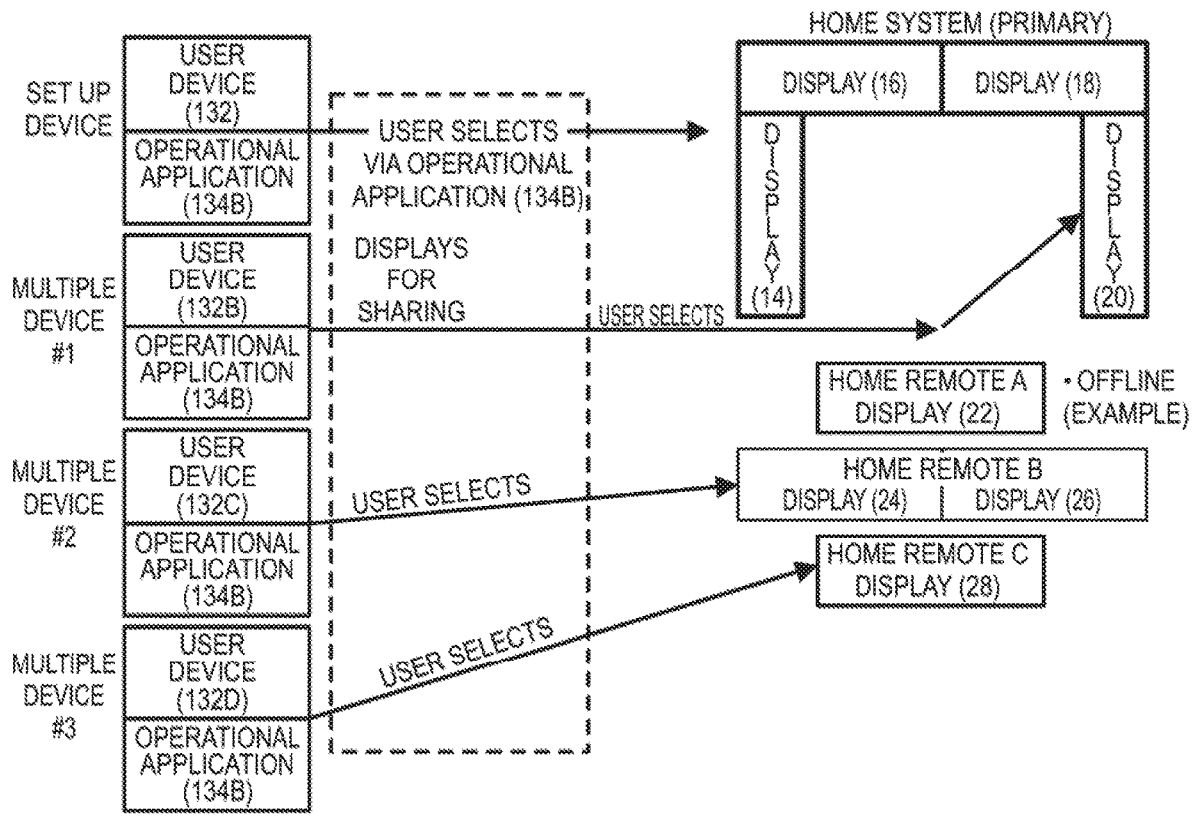
Figure 21:
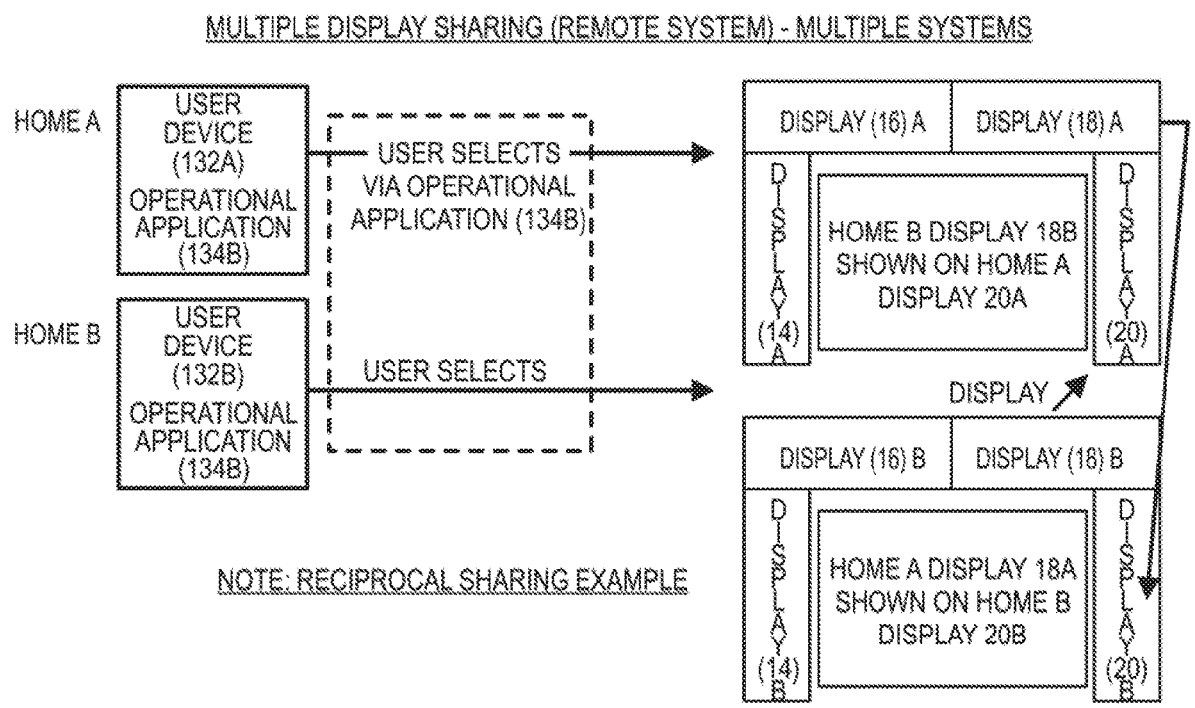
Figure 22:
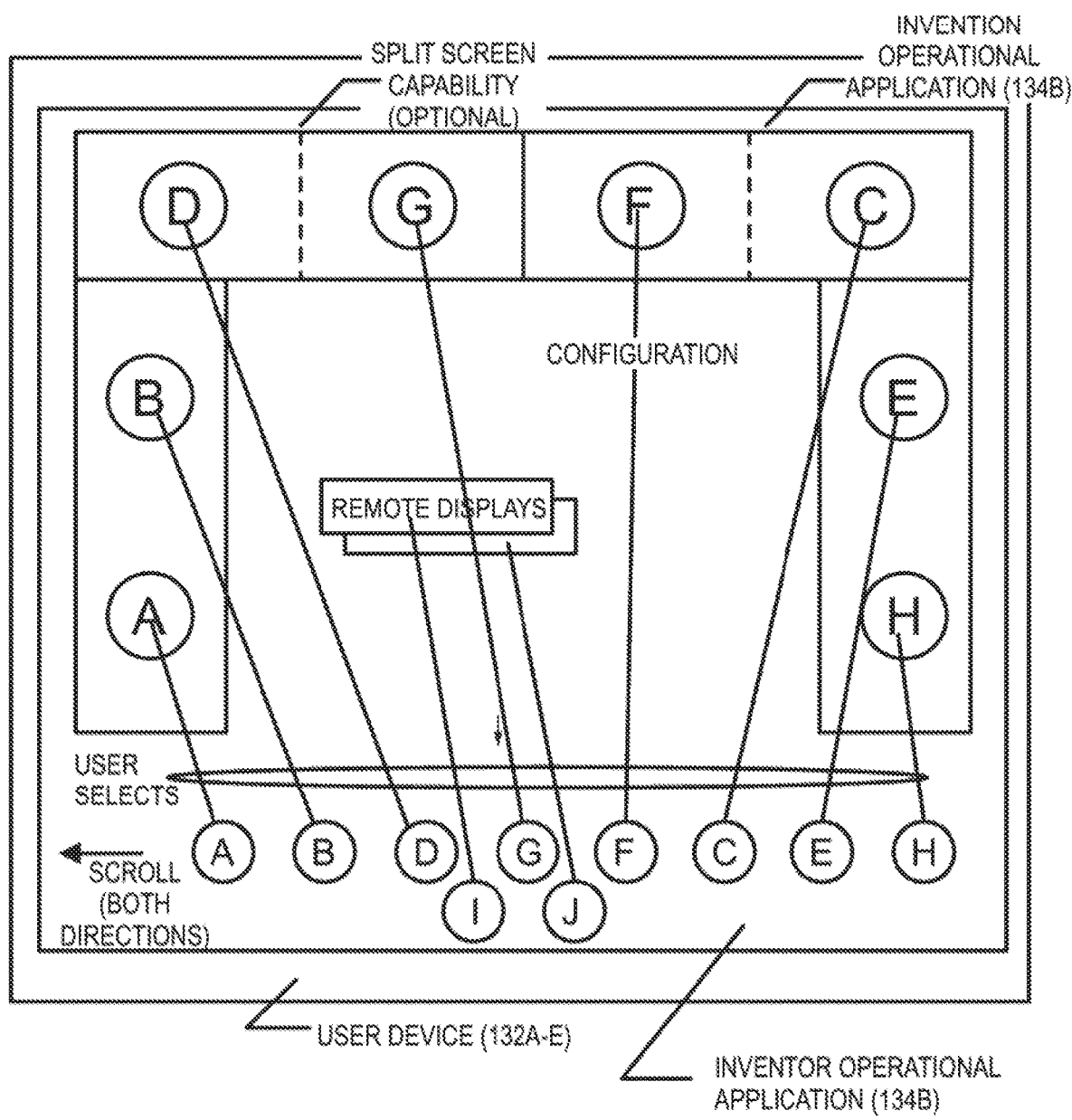
Figure 24:
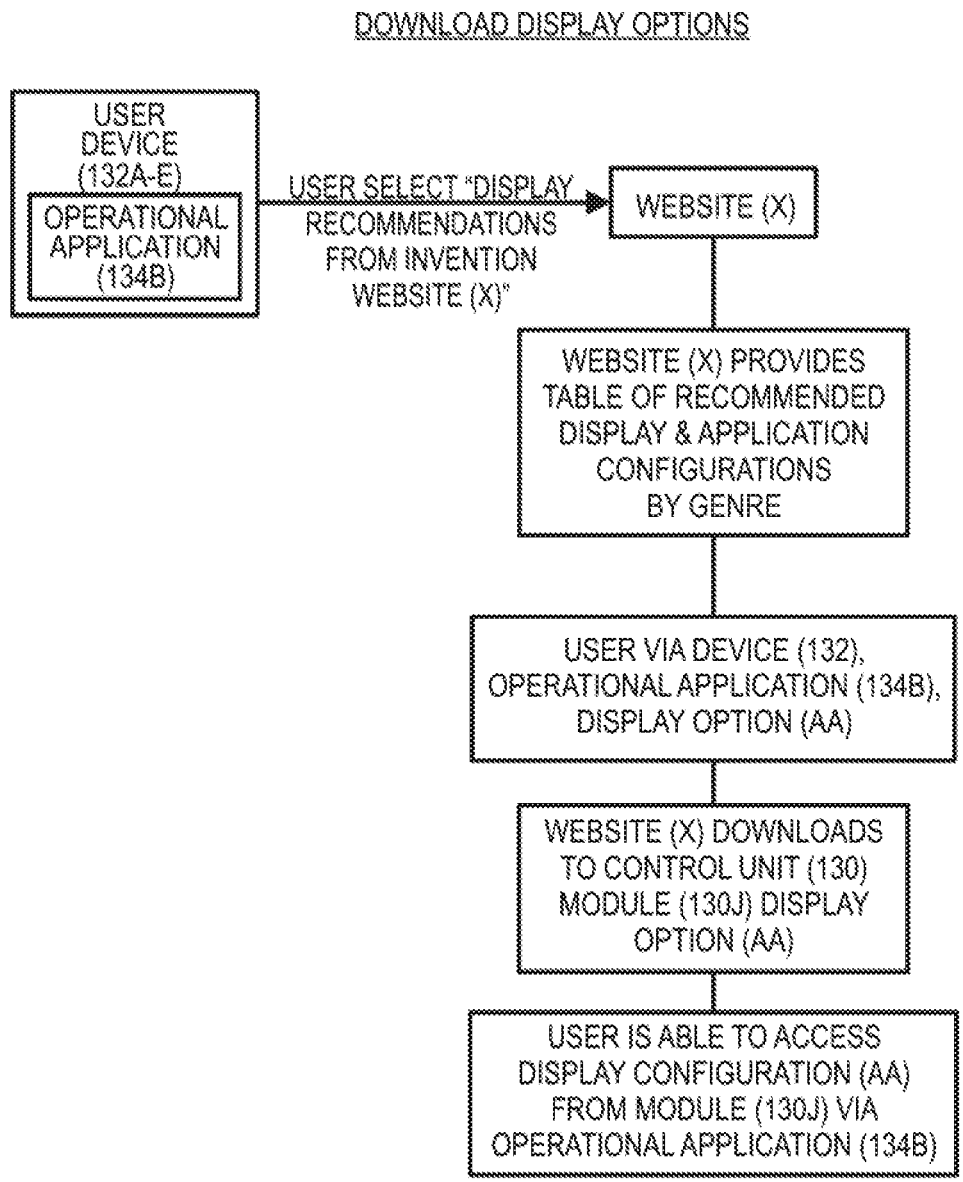
Figure 25A:
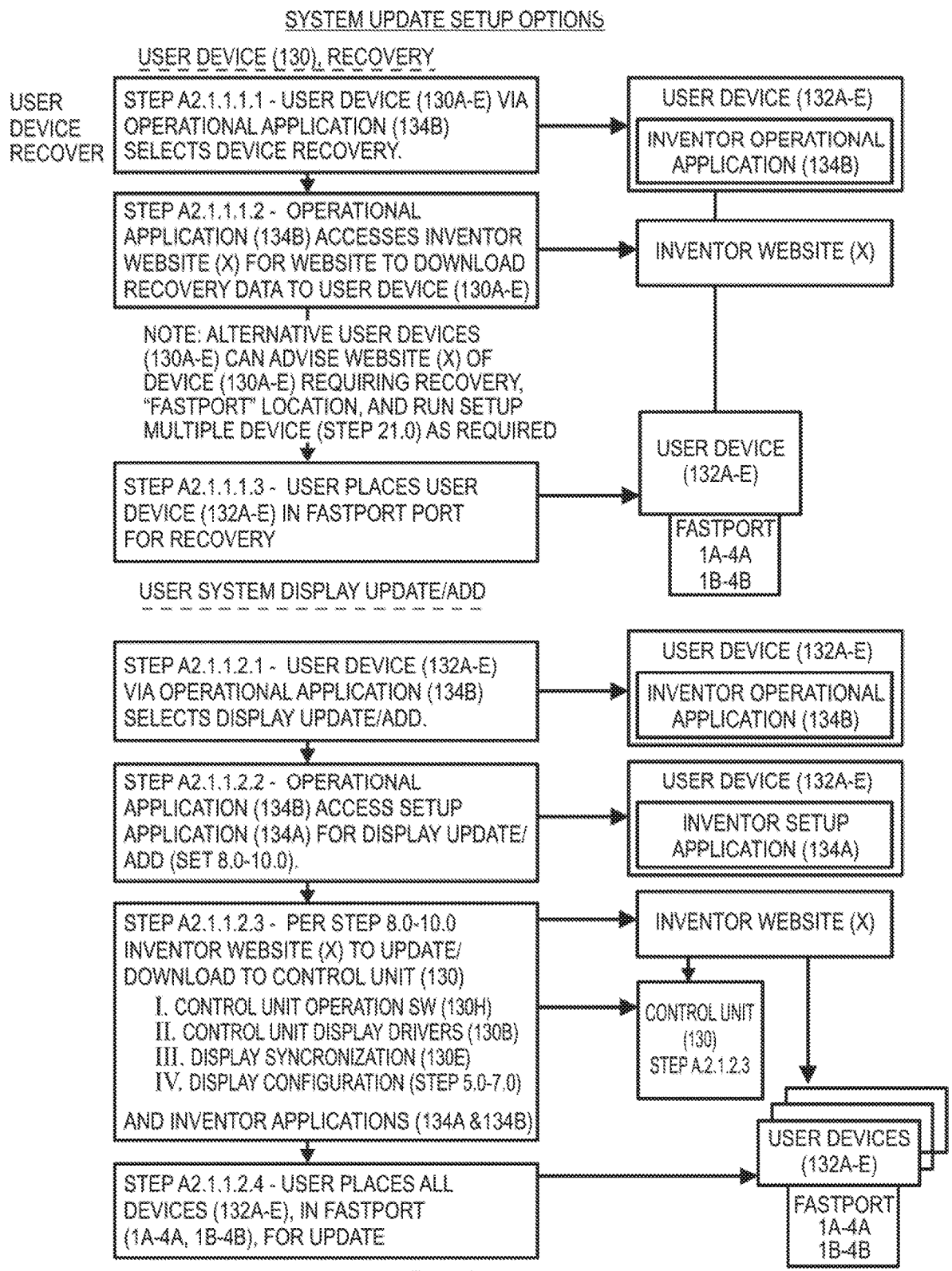
Figure 25B:
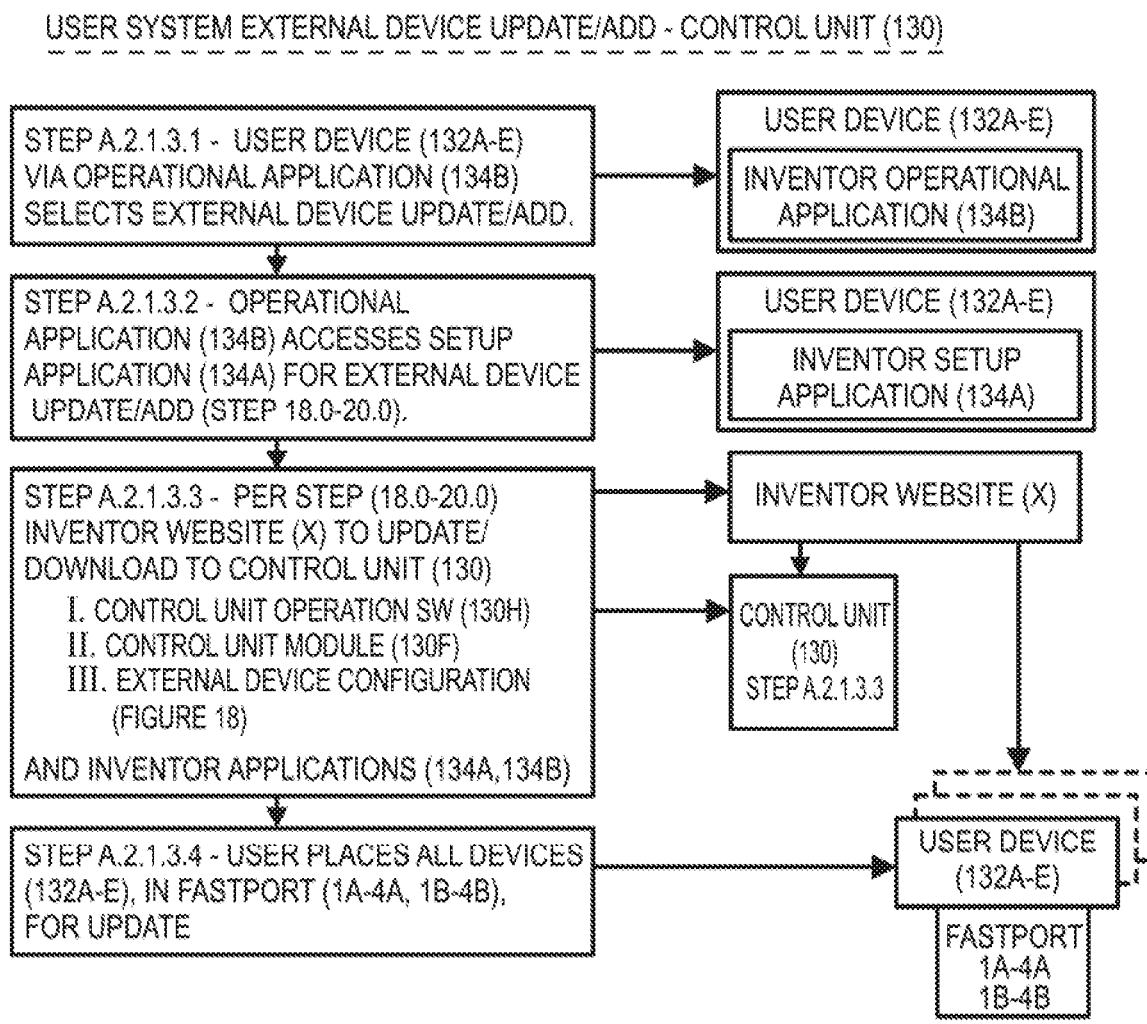

FIG. 8 is a schematic diagram of the main components of the invention according to one preferred embodiment;

FIG. 9 is a schematic diagram of the control unit functionality;

FIG. 10 is a schematic diagram illustrating the interaction between the user device and control unit;

FIG. 11 is a schematic diagram illustrating a "FastPort" function of the of the invention;

FIG. 12 is a schematic diagram of the control unit according to one preferred embodiment;

FIG. 13A is a schematic diagram and flow chart showing the functionality of the system setup routine;

FIG. 13B is a continuation of the schematic diagram and flow chart of FIG. 13A;

FIG. 13C is a continuation of the schematic diagram and flow chart of FIG. 13B;

FIG. 13D is a continuation of the schematic diagram and flow chart of FIG. 13C;

FIG. 13E is a continuation of the schematic diagram and flow chart of FIG. 13D;

FIGS. 14 and 15 demonstrate how the user device application of FIG. 14 represents the actual user configuration shown in FIG. 15;

FIG. 15 is a schematic diagram showing a typical user configuration;

FIG. 16 is a schematic diagram showing application selection for the control unit;

FIG. 17 is a schematic diagram showing control unit external device port management and setup;

FIG. 18 is a schematic diagram showing an external device display configuration;

FIG. 19 is a schematic diagram providing an overview of the function of the consumer electronic entertainment and display system according to an embodiment of the invention;

FIG. 20 is a schematic diagram showing sharing of multiple devices within a single location;

FIG. 21 is a schematic diagram showing sharing of multiple devices between remote locations and multiple systems;

FIG. 22 is a schematic diagram showing drag and drop display/application pairing;

FIG. 23 is schematic diagram showing a example of a user selection application for an active interface;

FIG. 24 is a schematic diagram showing content download display options;

FIG. 25A is a schematic diagram showing system update setup options;

FIG. 25B is a continuation of the schematic diagram of FIG. 25A;

FIG. 25C is a continuation of the schematic diagram of FIG. 25B; and

Figure 26:
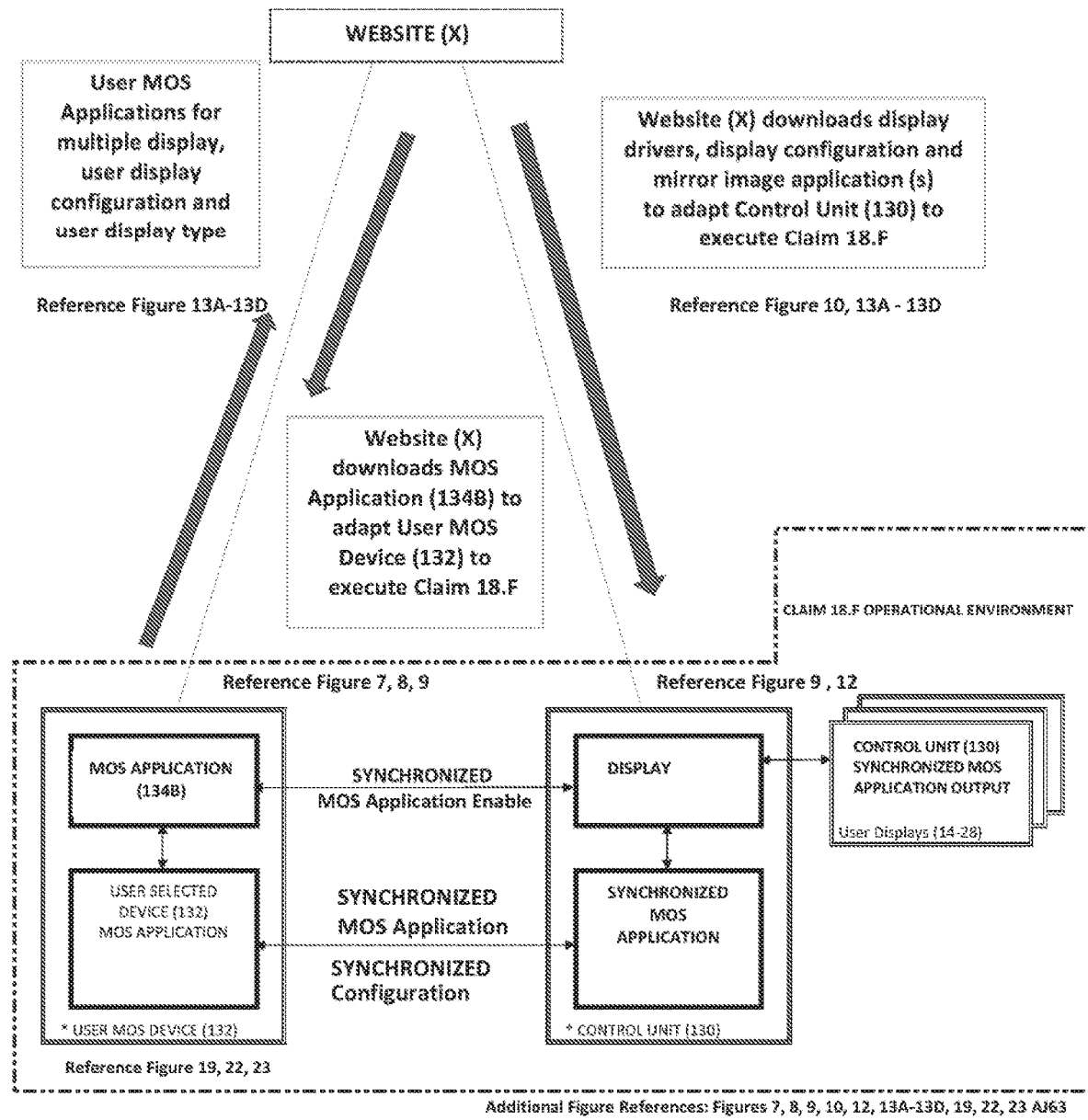

FIG. 26 is a schematic diagram showing operation of the claimed system to achieve synchronization of MOS applications used by multiple users as described in previous drawing figures.

DETAILED DESCRIPTION OF THE PREFERRED EMBODIMENT

Figure 1:
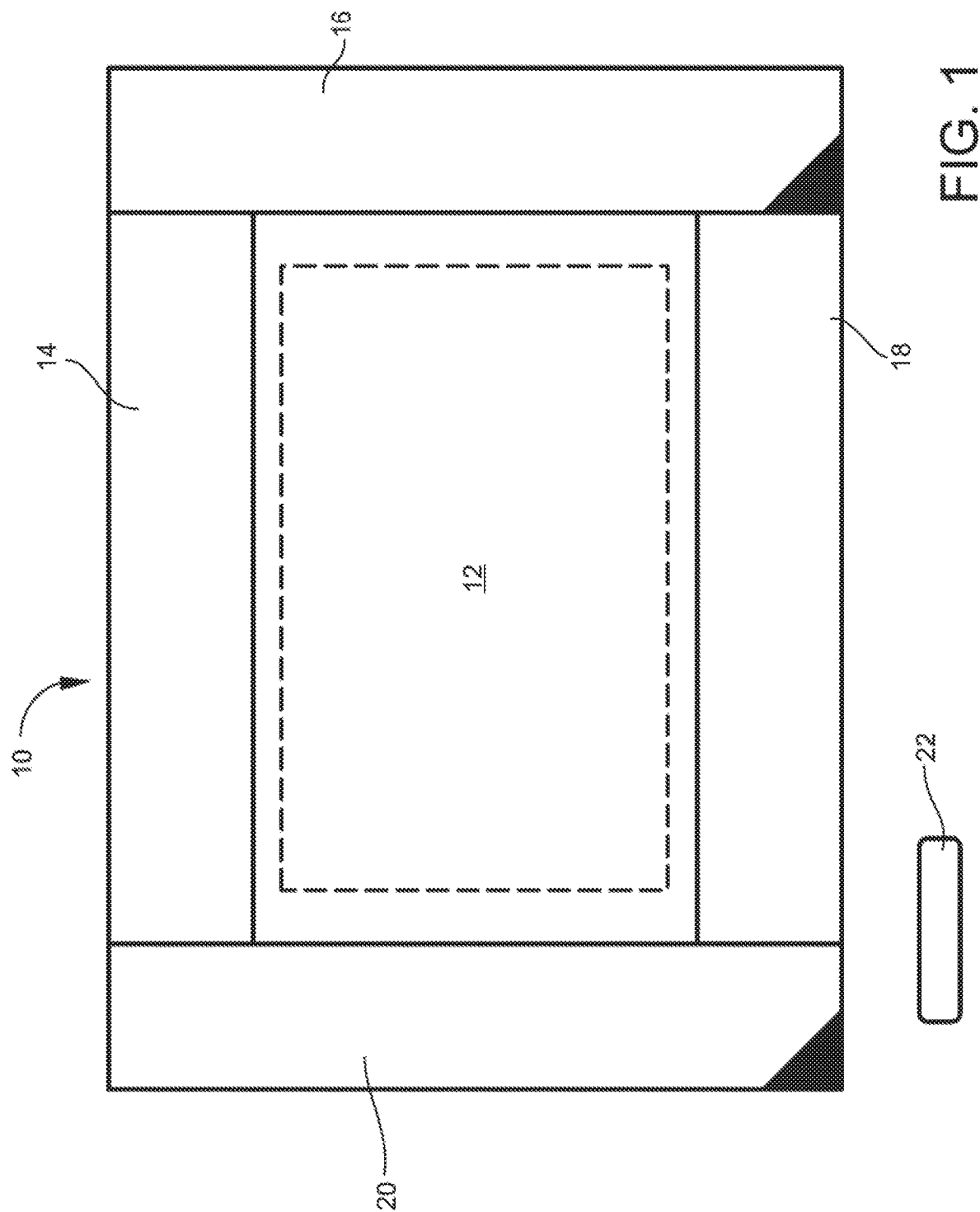
FIG. 1 is a schematic representation of a consumer electronic entertainment and display system according to one embodiment of the present invention with four secondary displays.

Referring now to FIG. 1 of the drawings, a consumer electronic entertainment and display system according to one illustrative embodiment of the invention is shown at reference numeral 10 and includes a primary audio/video display 12, such as a plasma or LED technology-based unit, which may be user-supplied, and may or may not be configured to the control unit or provided as part of the system. The system 10 includes four (4) secondary displays 14, 16, 18 and 20 that are positioned around the periphery of the primary display 12. The secondary displays 14, 16, 18 and 20 may be placed directly against the sides of the primary display 12 or, as shown, positioned in spaced-part relation on a wall or on a support such as an entertainment center. A control system 22 is electronically connected to both the primary display 12 and the secondary displays 14, 16, 18 and 20 and controls the operation of the entire system, or only selected components. In a typical arrangement, the primary display 12 would provide audio/video by means of an interface such as an HDMI connection to a cable system, broadcast station, satellite feed or internet streaming feed The secondary displays 14, 16, 18 and 20 may be used to provide any desired supplemental display information, which may be of the same type as being fed to the primary display or may be information transmitted from an internet or other digital data source, or a static data source such as read-only or random access memory, flash drives, CD's, DVD's or other sources, presently known or unknown.

The primary display information and the supplemental display information may be interactive with each other. For example, when the primary display 12 is showing an advertisement, the supplemental display information may be order information with the ability to order through on or more of the secondary displays 14, 16, 18 and 20 the product or service being advertised on the primary display. For another example, if the primary display 12 is showing an automobile race, one or more of the secondary displays 14, 16, 18 and 20 may be providing information about the race participants, including interviews, racing statistics and history, in-car video or any other related information. The system has particular utility as a video gaming device and as a way of providing visually appealing static images on the secondary displays 14, 16, 18 and 20 that complement the active display of the primary display 12.

Similarly, a viewer can be watching entertainment on the primary display 12 why carrying on an audio/video conversation via Skype® or some other similar system. Multiple secondary displays facilitate several simultaneous secondary displays as, for example, conversations with multiple individuals via the internet.

Figure 2:
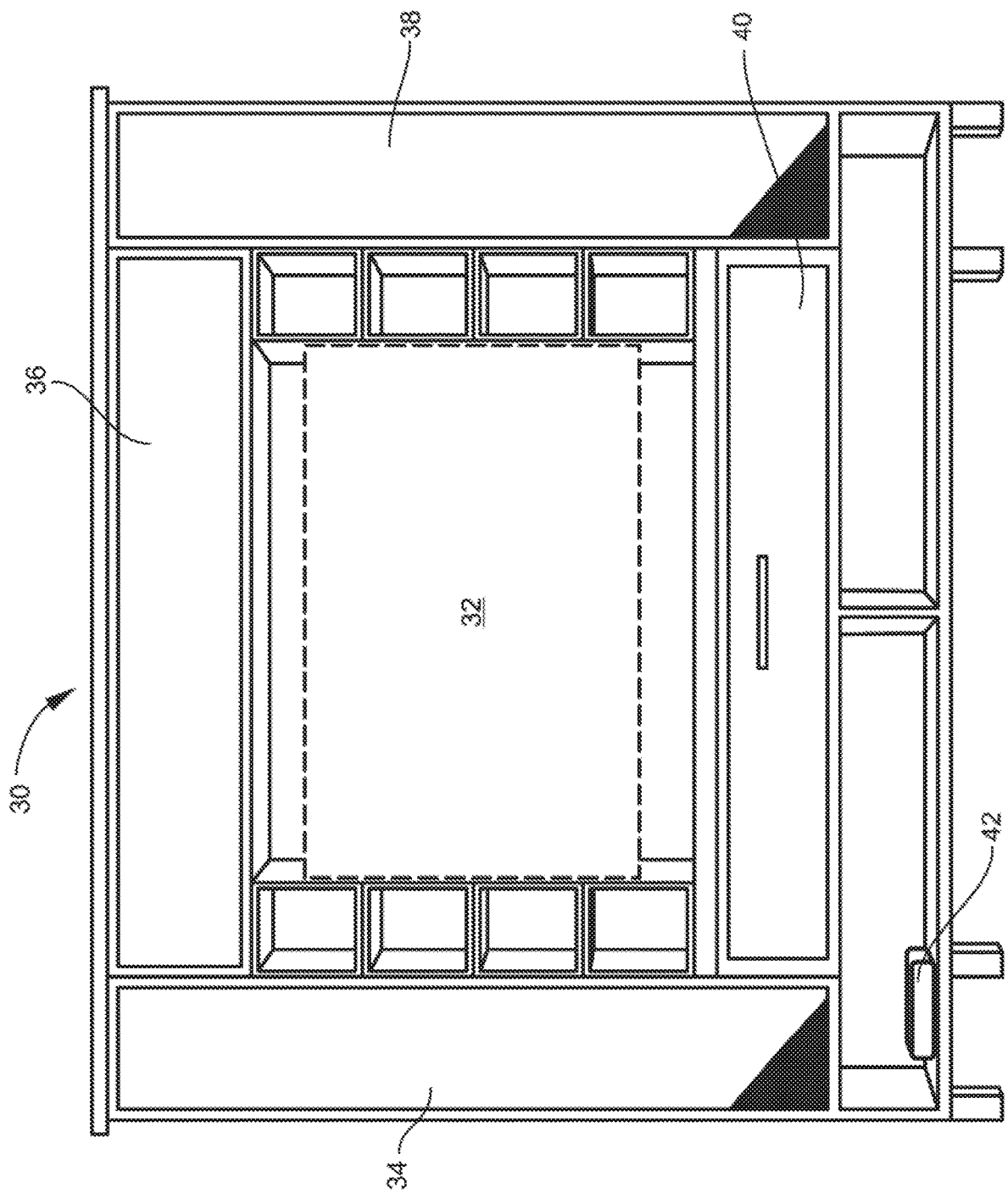
FIG. 2 is another schematic representation of a consumer electronic entertainment and display system according to an embodiment having three secondary displays.

FIG. 2 shows a consumer electronic entertainment and display system according to another illustrative embodiment of the invention at reference numeral 30 and includes a primary display 32 and three (3) secondary displays 34, 36 and 38. The system 30 is installed in a home entertainment center 40 that may include peripheral electronic devices such as sound bars, DVD, Blu-Ray and VHS players, game boxes digital recorders and the like. All or some of these systems may be controlled by a control system 42.

Figure 3:
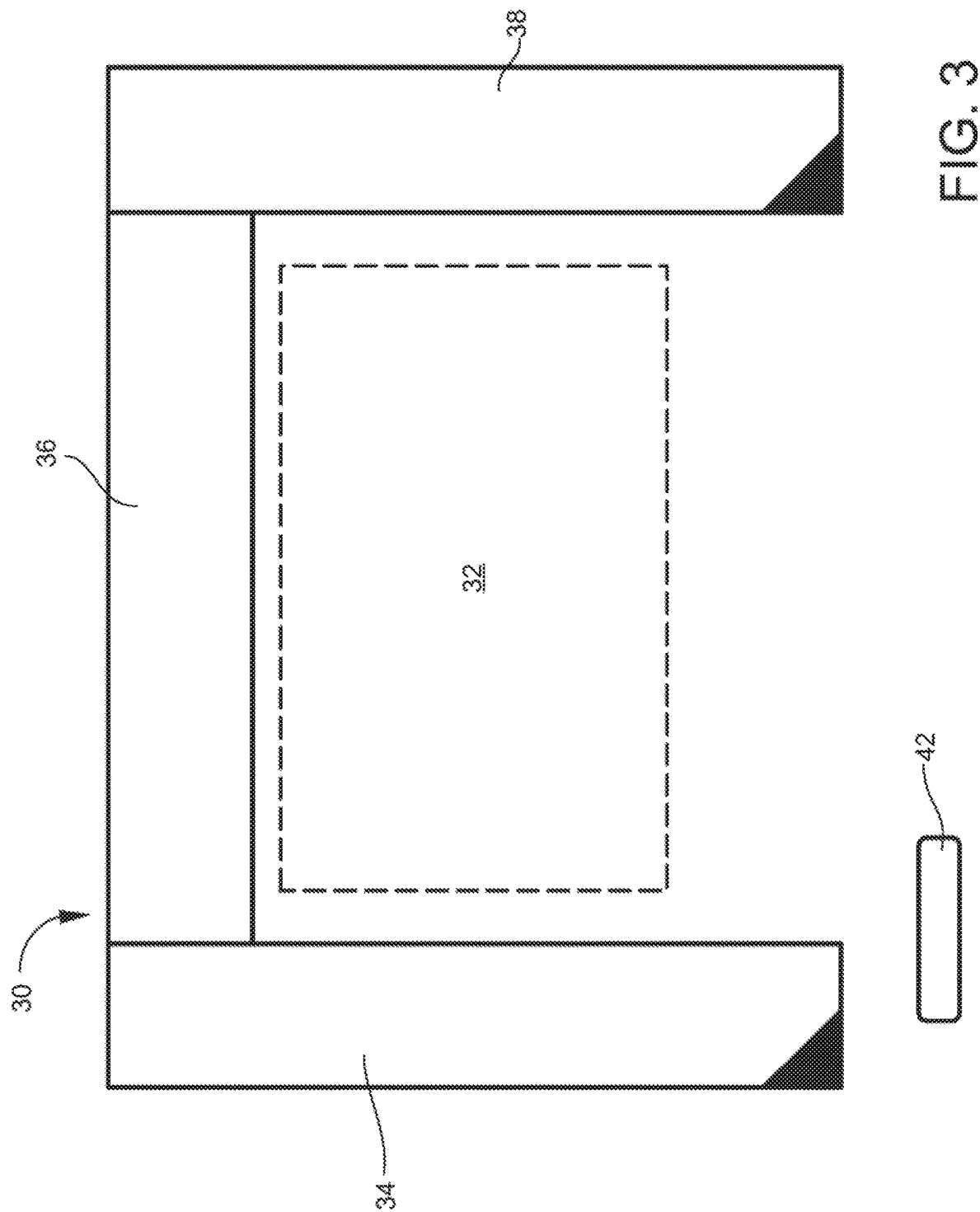
FIG. 3 is a schematic representation of a consumer electronic entertainment and display system according to an embodiment where there are three secondary displays spaced apart from a centrally positioned primary display.

FIG. 3 shows the system 30 but as a freestanding unit or hung from a wall or other support, not shown.

Figure 4:
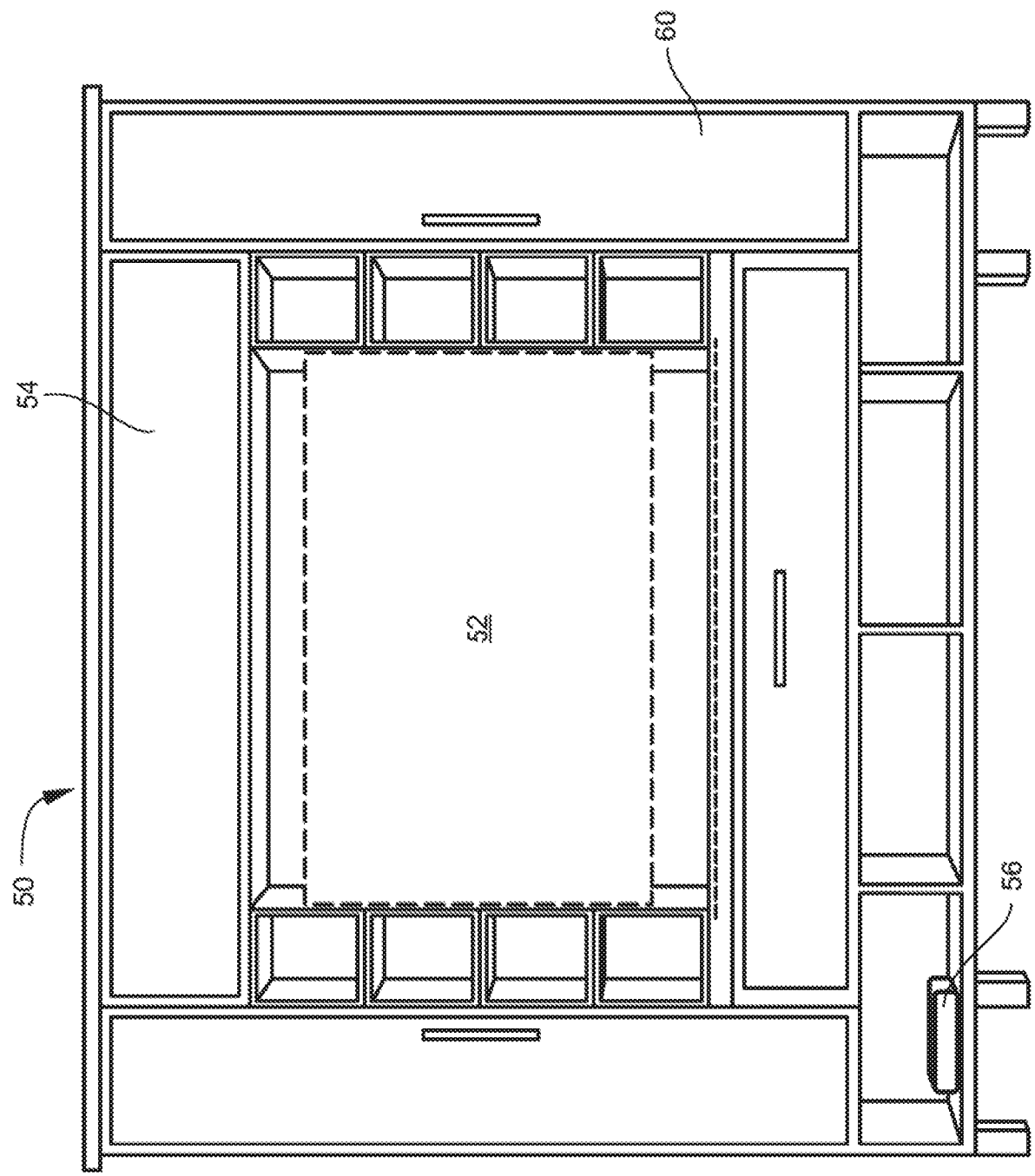
FIG. 4 is a schematic representation of a consumer electronic entertainment and display system according to an embodiment where there is a single secondary display positioned above a centrally-positioned primary display in combination with other home entertainment components.

FIG. 4 shows a consumer electronic entertainment and display system according to another illustrative embodiment of the invention at reference numeral 50, and includes a primary display 52 and a single secondary display 54 positioned above the primary display 52. The system 50 is installed in a home entertainment center 60 that may include peripheral electronic devices such as sound bars, DVD, Blu-Ray and VHS players, game boxes digital recorders and the like. All or some of these systems may be controlled by a control system 56.

Figure 5:
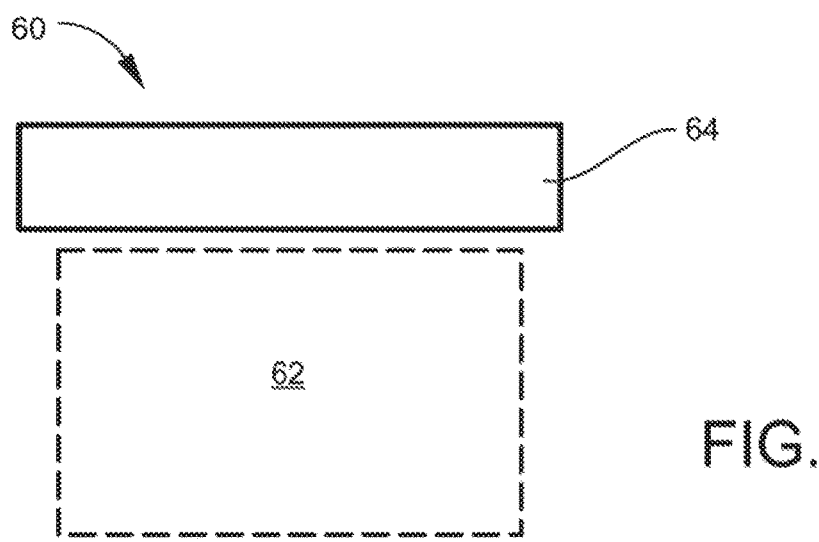
FIG. 5 is a schematic representation of a consumer electronic entertainment and display system according to an embodiment where there is a single secondary display positioned above a centrally-positioned primary display.

FIG. 5 shows a system 60 as a freestanding unit or hung from a wall or other support, not shown. The system 60 includes a primary display 62 over which is suspended or hung a secondary display 64. All or some of these systems may be controlled by a control system 66.

As shown in FIG. 6, a system 70 includes a primary display 72 four (4) secondary displays 74, 76, 78 and 80 that are positioned around the periphery of the primary display 72. The secondary displays 74, 76, 78 and 80 are shown positioned around the primary display 72 and an entertainment center 82. A control system 84 is electronically connected to both the primary display 72 and the secondary displays 74, 76, 78 and 80. All or some of these systems may be controlled by a control system 84.

Referring now to FIG. 7, components can be used to form systems within the scope of the invention that utilize wireless hardware and software to access, download, apply and view desired active and static video data. The consumer electronic entertainment and display system 100 includes a primary audio/video display, not shown but as shown above with reference to FIGS. 1-6, such as a plasma or LED technology-based unit 112 which may be user-supplied or provided as part of the system 100. The system 100 includes a plurality of secondary display units, which may be four (4) secondary displays 114, 116, 118 and 120 that are positioned around the periphery of the primary display 112. A control system 130 is electronically connected to both the primary display 112 and the secondary displays 114, 116, 118 and 120 and controls the operation of the entire system or only selected components.

In a typical arrangement, the primary display 112 provides audio/video by means of an interface such as an HDMI connection to a cable system, broadcast station, satellite feed or internet streaming feed such as Netflix®.

The control unit 130 accepts media content selected by the consumer's smartphone or tablet input device 132, via an interface incorporated into the control unit 130. By "smartphone" or "tablet" is meant an internet-enabled wireless electronic device that includes touch-activated displays and the ability to download and use an in-device application 134, including third party applications, to access and control remote applications. As presently used, devices such as Apple iPhone®, iPod® and Samsung Galaxy® devices are illustrative of the type of device that is usable via a wireless protocol to access and control remote devices. The terms "smart phone" and "tablet" also means future developments that may vary or broaden the capabilities of these input devices as currently enabled.

In addition, other input devices such as netbooks, touchscreen personal computers and interactive whiteboards, such as the Microsoft® Surface® and conventional and touchscreen laptops are within the definition of input devices that are illustrative of the types of devices that are usable via a wireless protocol to access and control remote devices and are within the intended scope of the invention.

As presently enabled, the control unit 130 is accessed by the consumer's existing WI-FI application and/or Bluetooth® interface 136 via the input device 132, The video media is sized appropriately via resident display drivers of the display units 114, 116, 118 and 120 and the media is downloaded onto these displays 114, 116, 118 and 120 as selected by the consumer. Alternatively, the display system 100 can include access devices customized to the display system 100 rather than relying on the consumer's own internet-enabled device.

The display units 114, 116, 118 and 120 provide the maximum entertainment value to the consumer. Of course, the number of display units is consumer selectable and need not be any specific number. The display units 114, 116, 118 and 120 receive information as synchronized through the display system drivers that are resident and functioning in the control unit 130.

The display units 114, 116, 118 and 120 can receive data from the control unit 130 via a standard commercially available USB cable or other suitable connection, wired or wireless according to present or future technology and protocols.

As shown in FIG. 7, one desirable manner of controlling the selection and display of remote content on the display units 114A, 116A, 118A and 120A is to provide a diagrammatic representation of the arrangement of the display units 114, 116, 118 and 120 on the screen of the input device via the application 134. For example, the graphic representation of display unit 114 on the input device 132 may appropriately display a specific wirelessly accessed website, static image or other desired input that is transmitted via the control unit 130 to the actual display unit 114. The user may sequentially select content for as many or as few of the display units 114A, 116A, 118A and 120A via the touch screen of the input device 132 as desired that are transmitted to the actual display units 114, 116, 118 and 120. An optional timer may automatically change the displays 114, 116, 118 and 120 at user pre-selected intervals based on a queue of pre-selected active or static content. One type of suitable protocol for the control unit 130 is Real Time Streaming Protocol (RTSP), a network control protocol designed for use in entertainment and communications systems to control streaming media servers. The protocol is used for establishing and controlling media sessions between end points. Clients of media servers issue VCR-style commands, such as play, record and pause, to facilitate real-time control of the media streaming from the server to a client (Video On Demand) or from a client to the server. Other protocols, present and future, that provide the functionality described above are suitable, as well.

The display system 100 may include custom mounting racks, cabinetry, and hardware, or existing commercially available mounting equipment may be used.

Referring now to FIGS. 8-25C, a more detailed explanation and description of the invention is provided. As shown in FIG. 8, the interactive entertainment system includes three principal elements, the control unit 130, the input device 132, which transmits application information, communicating with the control unit via a wireless protocol such as Bluetooth, and a website X. Communication between the control unit 130 and the website X is illustrated in FIG. 8. and the input device 132 and the website X are via the user's wifi connection and a module referred to as a "FastPort" module see FIG. 25C, that allows a rapid download of consumer information stored on the website X, including recovery of data/configuration characteristics as structured by the consumer via the setup and operational elements of the invention, as defined in this application.

In addition to rapid data transfer and recovery, the FastPort module of FIG. 25C has application in the gaming industry to facilitate and provide gamers with the opportunity, via the combination of the website X, control unit 130 and user device 132 and MOS device applications 134A, 134B. This allows a gamer to partner with other consumers, and dedicate specific displays to simultaneously observe their chosen partners' display. This function has particular appeal to "call of duty" gaming, for example, and will require very speed data transfer to present the effect of simultaneous interaction.

The control unit 130 contains a mobile operating system ("MOS") [need to further define] application/synchronous display module 130E, managed by the control unit 130 system operation software.

As shown in FIG. 9, the MOS application/synchronous display module of input device 130 provides the capability to display, via user displays (14-28) and multiple user MOS devices (132A-E) applications, as selected by user via MOS device application (134A, 134B). As shown in FIGS. 14 and 15, user displays 14-28 managed by control unit 130 can be located contiguously or remotely and user-selected illustrated in FIG. 20. User displays 14-28 managed by the control unit 130 can also be shared between users via user MOS device 130A-E) operational application 134B as shown in FIG. 21.

Referring to FIG. 10, the control unit 130, display driver 130B, control unit operational software 130H and MOS application display module software 130E are configured by website X via selections made by user with the user device 132A-E, setup application 134A and operation application 134B. As shown in FIG. 11, the "fastport" module allows for rapid upload/download of information from and to control unit 130, multiple user device 132A-E and website X. See also FIG. 8.

The MOS device application (134A, 134B), resident on user devices (132A-E), selects MOS applications resident on user devices (132A-E) for display portfolio via FIG. 16 and selected for display on displays (14-28) as depicted by FIG. 22 and represented to user as depicted by FIG. 18.

Referring now to FIGS. 13A-13F, setup of the system is described. In FIG. 13A the user accesses the website X, step 1, and downloads system setup application 134A, step 2. The user is prompted to confirm a "handshake" between the setup application 134A and the user device 130, step 3. The setup application 134A initiates system configuration, step 4.

FIG. 13B, steps 5-10, allows the user to define a display configuration, and carry forward the setup through user device 132 synchronization.

FIG. 13C, steps 11-17, continues the setup, which synchronizes and sequences the desired content and sends applications to the user device 132 via the setup application 134A.

In FIG. 13D, steps 10-18-21.1, the inventor setup application 134A directs the user device 132 to the website X for identification of external devices and types. See FIG. 17. The setup process continues through step 21.1, where the user is prompted to place the user device 132 into the control unit 130 to access the website X to download the operational application 134B to the user device 132.

Finally, as shown in FIG. 13E, the manner by which multiple user devices 132 are setup for use is illustrated and explained in step 22. Confirmation that the upload for multiple user devices has been successful prompts the website X to download control unit 130 operation software, thus completing the setup process.

Referring now to FIG. 14, a display configuration setup is illustrated and explained, showing a different arrangement of the displays shown in FIG. 1. Displays 16 and 18 are shown in landscape orientation and side-by-side. Displays 14 and 20 are shown in portrait orientation and extending down from respective displays 16 and 18. Several remote displays 22, 24, 26 and 28 are shown, all in landscape orientation, and operated via the same wifi and Bluetooth as the displays 14, 16, 18 and 20, all of which are operated by the control unit 130 via Bluetooth. A typical physical user configuration is shown in FIG. 15.

As shown in FIG. 16, the setup application 134A allows applications for multiple display systems, as illustrated in FIGS. 14 and 15 to be selected by the user via a drag and drop screen as the user scrolls the screen image of the user device 132 left or right.

In FIG. 17 the external device port management and setup is illustrated and explained. Port 1 is dedicated to user functions as part of the control unit to accept user devices 134A-E for the purpose of expediting user device and data recovery and charging. User ports 2.0-9.0 are provided and may be dedicated to specific functions. As shown in FIG. 17, ports 2.0 through 9.0 are dedicated to a camera, speaker, game port, microphone, computer, VCR, keyboard and mouse, respectively, with functions further identified in the "Purpose of" column.

FIG. 18 illustrates the display configuration of the external devices added to a display configuration for displays 14-28.

Referring to FIG. 19, an overview of the functional operation of the system is illustrated and explained. In step B.0 the user can select from several functions, A1-A3. Entertainment option A1 branches to the function selections shown in A1.1-A1.3. System options A2 branch to A2.1 and noted sub-options.

Multi-device display sharing with a single system, for example a system within a home, is illustrated and explained in FIGS. 20 and 21. In the illustrated example four devices (setup device and multiple devices 1, 2 and 3) are configured via the operational application 134B. The user selects displays for sharing, which may be displays 14, 26, 18, 20, or a home remote display 22, home remote display 24 or 26, or a home remote display 28, as shown.

FIG. 21 illustrates and explains multiple display sharing with a remote system, or multiple systems. As shown, a user in Home A and a user in Home B independently select desired displays to view via the operational application 134B. A loop between the two systems allows both users to view the same content. The Home A user selects displays via operational application 134B, as does the Home B user. The loop allows reciprocal sharing, as noted on the diagram.

As shown in FIG. 22, the operational application 134B allows the user device 132A-E to supply display options A-J, displayed across the bottom of the screen to be dragged up onto a graphical representation of the orientation and location of the local displays A-H and remote displays I and J. Note that any display option can be dragged to any of the displays, as shown. See also FIG. 15. As shown in FIG. 23 the user can select any of the displays to function as an active display allowing active input from the user device 132. See FIG. 7. This function is useful in gaming activities and the like.

Display options can be downloaded from the operational application 134A of the user device 132. The website X is programmed to contain display recommendations and application configurations by genre. The user device 132 is capable of storing prior configurations in the control unit 130 for access and display configuration loading on demand. The website X recommended display and application configurations may require user download of new applications via the setup functional overview, see FIG. 13C, which will run in the background until needed.

The system update setup options are shown and explained in FIGS. 25A-C. User device recovery A.2.1.1.1 allows recovery when data is lost due to battery failure or other unexpected anomaly. Recovery data is accessed on the website X for download. User system display update A.2.1.1.2 allows the control unit 130 to be updated from data contained on the website X. FIG. 25B, A.2.1.3 explains the update routine for the control unit 130. FIG. 25C, A.1.1.4 explains the routine for updating the user device 130.

Referring now to FIG. 26, this figure simplifies previous drawing figures to illustrate the downloading of the MOS Application from a website "X" to adapt a user's MOS device.

A consumer electronic entertainment and display system according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

I claim:

1. An electronic entertainment and display system, comprising:
   (a) a website configured to interface with a user mobile operating system (MOS) device and system control unit to display user selected MOS application output not displayed on the website via the system control unit, and further configured to direct the system control unit output from a primary user selected display to a secondary user selected display;
   (b) the system control unit adapted to display MOS application output as selected by the system MOS application resident on the user MOS device to at least one user display;
   (c) the mobile operating system MOS application resident on the user MOS device adapted to communicate with the website to configure the system control unit and user MOS device based on the user display configuration and display type;
   (d) the mobile operating system MOS application resident on user MOS device for communicating with the system control unit to select MOS applications resident on the user MOS device for the system control unit to display on the at least one user display;
   (e) the mobile operating system MOS application resident on the user MOS device for interacting with the system control unit MOS application output, as displayed on the at least one user display;
   (f) the MOS application and the system control unit configured to simultaneously display synchronized multiple user-selectable MOS application output on multiple user selected displays which remain active on user displays independent of the user MOS device as displayed on the user display via the system MOS application resident on the user MOS device; and
   (g) the MOS application and the system control unit being further selectable by the primary user to select the system control unit MOS application output as displayed on the primary user display and direct that output to the secondary user selected display.

* * * * *